US011290651B2

(12) United States Patent
Irie et al.

(10) Patent No.: US 11,290,651 B2
(45) Date of Patent: Mar. 29, 2022

(54) IMAGE DISPLAY SYSTEM, INFORMATION PROCESSING APPARATUS, IMAGE DISPLAY METHOD, IMAGE DISPLAY PROGRAM, IMAGE PROCESSING APPARATUS, IMAGE PROCESSING METHOD, AND IMAGE PROCESSING PROGRAM

(71) Applicants: Hironori Irie, Tokyo (JP); Toshiyuki Terashita, Tokyo (JP); Tomohiko Sasaki, Tokyo (JP); Ryuichi Shirane, Chiba (JP)

(72) Inventors: Hironori Irie, Tokyo (JP); Toshiyuki Terashita, Tokyo (JP); Tomohiko Sasaki, Tokyo (JP); Ryuichi Shirane, Chiba (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 17/133,801

(22) Filed: Dec. 24, 2020

(65) Prior Publication Data
US 2021/0120181 A1 Apr. 22, 2021

Related U.S. Application Data

(63) Continuation of application No. 16/227,333, filed on Dec. 20, 2018, now Pat. No. 10,931,878, which is a (Continued)

(30) Foreign Application Priority Data

Feb. 9, 2015 (JP) .................................. 2015-023176

(51) Int. Cl.
*H04N 5/232* (2006.01)
*G06F 3/0488* (2022.01)
(Continued)

(52) U.S. Cl.
CPC ....... *H04N 5/23293* (2013.01); *G02B 5/3083* (2013.01); *G06F 3/0485* (2013.01);
(Continued)

(58) Field of Classification Search
CPC ............. H04N 5/23293; H04N 5/2258; H04N 5/23216; H04N 5/23238; G06F 3/04815;
(Continued)

(56) References Cited

U.S. PATENT DOCUMENTS 8,246,455 B2 8/2012 Kawabata
9,251,561 B2 2/2016 Furumura et al.
(Continued)

FOREIGN PATENT DOCUMENTS

EP 2595043 5/2013
JP H10-191261 7/1998
(Continued)

OTHER PUBLICATIONS

International Search Report dated Mar. 1, 2016 in PCT/JP2016/000531 filed on Feb. 2, 2016.
(Continued)

*Primary Examiner* — Hung H Lam
(74) *Attorney, Agent, or Firm* — IPUSA, PLLC

(57) ABSTRACT

An image display system includes an image acquisition unit which acquires an image, an area setting unit which sets a plurality of viewing areas to which the image is to be assigned according to a direction of the image, an image assignment unit which assigns the image to each of the plurality of viewing areas, an operation determination unit which discriminates an operation in a first viewing area among the plurality of viewing areas each having the image assigned thereto, and a display control unit which displays the image in the first viewing area and the image in a second viewing area other than the first viewing area among the (Continued)

plurality of viewing areas concurrently based on a result of the discrimination by the operation determination unit.

18 Claims, 40 Drawing Sheets

Related U.S. Application Data continuation of application No. 15/527,058, filed as application No. PCT/JP2016/000531 on Feb. 2, 2016, now Pat. No. 10,212,351.

(51) Int. Cl.
| | | |
|---|---|---|
| *G06F 3/0485* | (2022.01) | |
| *G09G 5/14* | (2006.01) | |
| *G02B 5/30* | (2006.01) | |
| *G06F 3/04815* | (2022.01) | |
| *G06F 3/04845* | (2022.01) | |
| *H04N 5/225* | (2006.01) | |
| *G06F 3/048* | (2013.01) | |

(52) U.S. Cl.
CPC ........ *G06F 3/0488* (2013.01); *G06F 3/04815* (2013.01); *G06F 3/04845* (2013.01); *G09G 5/14* (2013.01); *H04N 5/2258* (2013.01); *H04N 5/23216* (2013.01); *H04N 5/23238* (2013.01); *G06F 2203/04803* (2013.01); *G09G 2340/0407* (2013.01); *G09G 2340/0464* (2013.01); *G09G 2340/14* (2013.01)

(58) Field of Classification Search
CPC .. G06F 3/04845; G06F 3/0485; G06F 3/0488; G06F 2203/04803; G02B 5/3083; G09G 5/14; G09G 2340/14; G09G 2340/0464; G09G 2340/0407
See application file for complete search history.

(56) References Cited

U.S. PATENT DOCUMENTS

| | | | |
|---|---|---|---|
| 10,447,918 B2 | 10/2019 | Kobayashi | |
| 10,447,934 B2 | 10/2019 | Takagi | |
| 10,866,693 B2* | 12/2020 | Kakinuma | .......... G06F 3/03547 |
| 2007/0229465 A1* | 10/2007 | Sakai | ...................... G08C 17/00 |
| | | | 345/173 |
| 2011/0134517 A1 | 6/2011 | Shirota et al. | |
| 2013/0083071 A1 | 4/2013 | Nakamura | |
| 2013/0145309 A1 | 6/2013 | Cho et al. | |
| 2014/0085219 A1* | 3/2014 | Cai | ................. H04N 21/42204 |
| | | | 345/173 |
| 2014/0152852 A1 | 6/2014 | Ito et al. | |
| 2014/0160233 A1 | 6/2014 | Ishida | |
| 2015/0077577 A1 | 3/2015 | Terashita | |
| 2015/0286395 A1 | 10/2015 | Kamada | |
| 2015/0350555 A1 | 12/2015 | Nishi | |
| 2016/0044235 A1 | 2/2016 | Cho et al. | |
| 2016/0048942 A1 | 2/2016 | Irie et al. | |
| 2016/0048992 A1 | 2/2016 | Irie et al. | |
| 2016/0295130 A1 | 10/2016 | Mølgaard et al. | |
| 2017/0034428 A1 | 2/2017 | Kwon et al. | |
| 2017/0054913 A1 | 2/2017 | Hara | |
| 2017/0185290 A1 | 6/2017 | Lim et al. | |
| 2017/0193634 A1 | 7/2017 | Kim et al. | |
| 2018/0027284 A1* | 1/2018 | Matsunaga | .......... H04N 21/435 |
| | | | 725/142 |
| 2018/0052576 A1 | 2/2018 | Lee et al. | |
| 2018/0232139 A1* | 8/2018 | Okuda | .................. G06F 3/0488 |
| 2020/0326821 A1* | 10/2020 | Takayama | ............... A63F 13/92 |
| 2021/0221664 A1* | 7/2021 | Okamoto | ............. G05D 1/0055 |

FOREIGN PATENT DOCUMENTS

| | | |
|---|---|---|
| JP | 2000-039947 | 2/2000 |
| JP | 2004-310351 | 11/2004 |
| JP | 2005-056295 | 3/2005 |
| JP | 2005-129118 | 5/2005 |
| JP | 2007-011061 | 1/2007 |
| JP | 4247218 | 4/2009 |
| JP | 2009-232319 | 10/2009 |
| JP | 2011-076249 | 4/2011 |
| JP | 2011-118188 | 6/2011 |
| JP | 2013-120596 | 6/2013 |
| JP | 2014-010611 | 1/2014 |
| JP | 2014-115863 | 6/2014 |
| JP | 2014-123271 | 7/2014 |
| JP | 2015-176559 | 10/2015 |
| JP | 2015-176560 | 10/2015 |
| WO | 2015/005184 | 1/2015 |

OTHER PUBLICATIONS

Japanese Office Action for 2015-023176 dated Jul. 21, 2015.
Japanese Office Action for 2015-023176 dated Oct. 6, 2015.
Japanese Office Action for 2015-023176 dated Dec. 22, 2015.
Yasushi Kumon, "360° VR panorama work perfect guide" Jan. 1, 2012, 1st Edition, pp. 048-058, Shuwa System Co.,Ltd.
Japanese Office Action for 2015-023176 dated May 24, 2016.
Japanese Office Action for 2016-215394 dated Jun. 27, 2017.
Japanese Office Action for 2016-215394 dated Oct. 24, 2017.
Extended European Search Report for 16748893.1 dated Jan. 5, 2018.
Extended European Search Report for 20177033.6 dated Oct. 9, 2020.

* cited by examiner

| VIEWING AREA PATTERN | NO. OF AREAS | RANGE OF IMAGE (INITIAL VALUE) | ARRANGEMENT PATTERN | STANDARD | ASSOCIATION DISPLAY DIRECTION |
|---|---|---|---|---|---|
| VIEWING AREA PATTERN-1 | 1 | AREA-1: $\theta = 90°$, $\phi = 0°$, $\alpha = 60°$ | — | — | — |
| VIEWING AREA PATTERN-2 | 2 | AREA-1: $\theta = 90°$, $\phi = 0°$, $\alpha = 60°$<br>AREA-2: $\theta = 270°$, $\phi = 0°$, $\alpha = 60°$ | 1: TWO ROWS (UP/DOWN) IN PORTRAIT ORIENTATION<br>2: TWO COLUMNS (RIGHT/LEFT) IN LANDSCAPE ORIENTATION<br>3: TWO COLUMNS (RIGHT/LEFT) (UP/DOWN)<br>4: DIAGONAL ARRANGEMENT (UP/DOWN, RIGHT/LEFT) (OTHERWISE, RESIZED AREAS) | AREA-1 (OTHER AREAS: ASSOCIATION) | MOVING:<br>SAME DIRECTION/<br>OPPOSITE DIRECTION<br>RESIZING:<br>SAME DIRECTION/<br>OPPOSITE DIRECTION |
| VIEWING AREA PATTERN-3 | 3 | AREA-1: $\theta = 90°$, $\phi = 0°$, $\alpha = 60°$<br>AREA-2: $\theta = 210°$, $\phi = 0°$, $\alpha = 60°$<br>AREA-3: $\theta = 330°$, $\phi = 0°$, $\alpha = 60°$ | 1: THREE ROWS IN PORTRAIT ORIENTATION, THREE COLUMNS IN LANDSCAPE ORIENTATION<br>2: THREE ROWS<br>3: THREE COLUMNS (OTHERWISE, RESIZED AREAS) | AREA-1 (OTHER AREAS: ASSOCIATION) | MOVING:<br>SAME DIRECTION/<br>OPPOSITE DIRECTION<br>RESIZING:<br>SAME DIRECTION/<br>OPPOSITE DIRECTION |
| VIEWING AREA PATTERN-4 | 4 | AREA-1: $\theta = 90°$, $\phi = 0°$, $\alpha = 60°$<br>AREA-2: $\theta = 180°$, $\phi = 0°$, $\alpha = 60°$<br>AREA-3: $\theta = 270°$, $\phi = 0°$, $\alpha = 60°$<br>AREA-4: $\theta = 360°$, $\phi = 0°$, $\alpha = 60°$ | 1: FOUR EQUALLY DIVIDED AREAS (GRID)<br>2: FOUR EQUALLY DIVIDED AREAS (X SHAPED)<br>3: FOUR ROWS<br>4: FOUR COLUMNS (OTHERWISE, RESIZED AREAS) | AREA-1 (OTHER AREAS: ASSOCIATION) | MOVING:<br>SAME DIRECTION/<br>OPPOSITE DIRECTION<br>RESIZING:<br>SAME DIRECTION/<br>OPPOSITE DIRECTION |
| VIEWING AREA PATTERN-5 | 5 | AREA-1: $\theta = 300°$, $\phi = 0°$, $\alpha = 60°$<br>AREA-2: $\theta = 0°$, $\phi = 0°$, $\alpha = 120°$<br>AREA-3: $\theta = 90°$, $\phi = 0°$, $\alpha = 60°$<br>AREA-4: $\theta = 180°$, $\phi = 0°$, $\alpha = 60°$<br>AREA-5: $\theta = 240°$, $\phi = 0°$, $\alpha = 60°$ | 1: FIVE EQUALLY DIVIDED AREAS (GRID)<br>2: FIVE UNEQUALLY DIVIDED AREAS (CENTRAL AREA ENLARGED) (OTHERWISE, RESIZED AREAS) | AREA-3 (OTHER AREAS: ASSOCIATION) | MOVING:<br>SAME DIRECTION/<br>OPPOSITE DIRECTION<br>RESIZING:<br>SAME DIRECTION/<br>OPPOSITE DIRECTION |
| ... | ... | ... | ... | ... | ... |

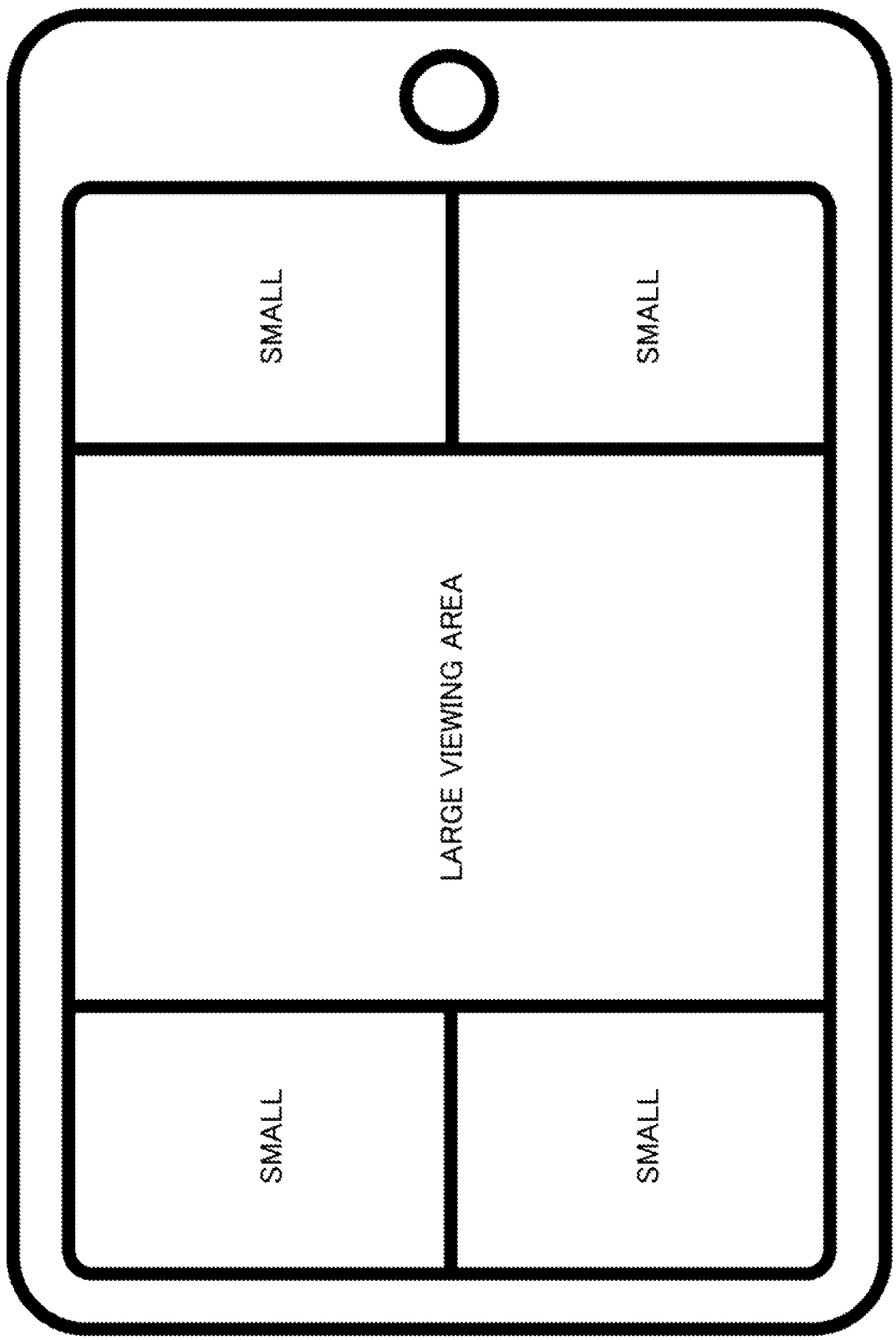

FIG.14

| AREA TRANSITION PATTERN | NO. OF AREAS | TRANSITION DIRECTION | TRANSITION OF OPERATIONS (STANDARD ⇔ ASSOCIATION) (AREA INCLUDING TOUCH STARTING POINT IS STANDARD) | TARGET OF ASSOCIATION |
|---|---|---|---|---|
| AREA TRANSITION PATTERN-2 | 2 | — LEFT ⇔ RIGHT<br>— UP ⇔ DOWN | AREA-1: STANDARD ⇒ ASSOCIATION<br>AREA-2: ASSOCIATION ⇒ STANDARD | — MOVING DIRECTION<br>— MOVING AMOUNT OF AREA SIMILARITY<br>— RESIZING |
| AREA TRANSITION PATTERN-3 | 3 | — LEFT ⇔ RIGHT<br>— UP ⇔ DOWN | AREA-1: STANDARD ⇒ ASSOCIATION<br>AREA-2: ASSOCIATION ⇒ STANDARD/ASSOCIATION<br>AREA-3: ASSOCIATION ⇒ STANDARD | — MOVING DIRECTION<br>— MOVING AMOUNT OF AREA SIMILARITY<br>— RESIZING |
| AREA TRANSITION PATTERN-4 | 4 | — LEFT ⇔ RIGHT<br>— UP ⇔ DOWN<br>— DIAGONAL (UP/DOWN /RIGHT/LEFT) | AREA-1: STANDARD ⇒ ASSOCIATION<br>AREA-2: ASSOCIATION ⇒ STANDARD/ASSOCIATION<br>AREA-3: ASSOCIATION ⇒ STANDARD/ASSOCIATION<br>AREA-4: ASSOCIATION ⇒ STANDARD/ASSOCIATION | — MOVING DIRECTION<br>— MOVING AMOUNT OF AREA SIMILARITY<br>— RESIZING |
| AREA TRANSITION PATTERN-5 | 5 | — LEFT ⇔ RIGHT<br>— UP ⇔ DOWN<br>— DIAGONAL (UP/DOWN /RIGHT/LEFT) | AREA-1: ASSOCIATION ⇒ STANDARD/ASSOCIATION<br>AREA-2: ASSOCIATION ⇒ STANDARD/ASSOCIATION<br>AREA-3: STANDARD ⇒ ASSOCIATION<br>AREA-4: ASSOCIATION ⇒ STANDARD/ASSOCIATION<br>AREA-5: ASSOCIATION ⇒ STANDARD/ASSOCIATION | — MOVING DIRECTION<br>— MOVING AMOUNT OF AREA SIMILARITY<br>— RESIZING |
| ⋮ | ⋮ | ⋮ | ⋮ | ⋮ |

| IMAGE ID |
|---|

| VIEWING AREA PATTERN | NO. OF AREAS | RANGE OF IMAGE (CURRENT VALUE) | ARRANGEMENT PATTERN | STANDARD | ASSOCIATION DISPLAY DIRECTION |
|---|---|---|---|---|---|

| VIEWING AREA PATTERN | NO. OF AREAS | TRANSITION DIRECTION | TRANSITION OF OPERATIONS (STANDARD ⇔ ASSOCIATION) (AREA INCLUDING TOUCH STARTING POINT IS STANDARD) | TARGET OF ASSOCIATION |
|---|---|---|---|---|

POLYGON DATA

IMAGE DISPLAY SYSTEM, INFORMATION PROCESSING APPARATUS, IMAGE DISPLAY METHOD, IMAGE DISPLAY PROGRAM, IMAGE PROCESSING APPARATUS, IMAGE PROCESSING METHOD, AND IMAGE PROCESSING PROGRAM

CROSS-REFERENCE TO RELATED APPLICATION

The present application is a continuation application and claims priority under 35 U.S.C 120 to U.S. patent application Ser. No. 16/227,333 filed on Dec. 20, 2018, which is a continuation application of U.S. patent application Ser. No. 15/527,058 filed on May 16, 2017, which is the National Stage of International Application No. PCT/JP2016/000531 filed on Feb. 2, 2016, which claims priority to Japanese Patent Application No. 2015-023176, filed on Feb. 9, 2015. The contents of the applications are incorporated herein by reference in their entirety.

TECHNICAL FIELD

The present invention relates to an image display system, an information processing apparatus, an image display method, an image display program, an image processing apparatus, an image processing method, and an image processing program.

BACKGROUND ART

Imaging and displaying of wide view images, including panoramic images (images with a wide field of view in a horizontal plane) and omnidirectional images (images with a field of view covering all directions), are becoming widespread. For example, see Japanese Laid-Open Patent Publication No. 2011-076249.

In a case of displaying a wide view image having a field of view covering all directions on a screen, if the wide view image is displayed in a viewing area of the screen, the visibility is lowered. A method for solving the problem is that partial images with field of views covering mutually different directions are displayed in a plurality of viewing areas.

When displaying the partial images of the different directions in the plurality of viewing areas, an image of a predetermined direction may be fixed in several of the viewing areas. In this case, operations of moving and resizing the image are not performed with respect to such viewing areas.

A method of enabling the moving and resizing operations to be performed with respect to a viewing area is conceivable. However, it is preferred that the moving and resizing operations can be performed with respect to the viewing areas independently of each other.

When a wide view image is displayed in a plurality of viewing areas, there is no user interface which provides appropriate operations for the characteristics of the wide view image. The problem is that a user is unable to perform a desired operation on the wide view image.

RELATED-ART DOCUMENT

Patent Document

[Patent Document 1] Japanese Laid-Open Patent Publication No. 2011-076249

SUMMARY OF INVENTION

In one aspect, the present invention provides a user interface which enables flexible operations to be performed when displaying an image in a plurality of viewing areas.

In one embodiment, the present invention provides an image display system including one or more processors, the processor including an image acquisition unit configured to acquire an image; an area setting unit configured to set a plurality of viewing areas to which the image is to be assigned according to a direction of the image; an image assignment unit configured to assign the image to each of the plurality of viewing areas; an operation determination unit configured to discriminate an operation in a first viewing area among the viewing areas each having the image assigned thereto; and a display control unit configured to display the image in the first viewing area and the image in a second viewing area other than the first viewing area among the viewing areas concurrently based on a result of the discrimination by the operation determination unit.

The object and advantages of the invention will be realized and attained by means of the elements and combinations particularly pointed out in the claims. It is to be understood that both the foregoing general description and the following detailed description are exemplary and explanatory and are not restrictive of the invention as claimed.

BRIEF DESCRIPTION OF THE DRAWINGS

FIG. 6 is a diagram showing an example of a viewing area pattern table;

FIG. 13 is a diagram showing an example of the arrangement pattern of viewing areas;

FIG. 14 is a diagram showing an example of an area transition pattern table;

FIG. 15 is a diagram showing an example of current data;

DESCRIPTION OF EMBODIMENTS

A description will be given of embodiments with reference to the accompanying drawings.

Figure 1:
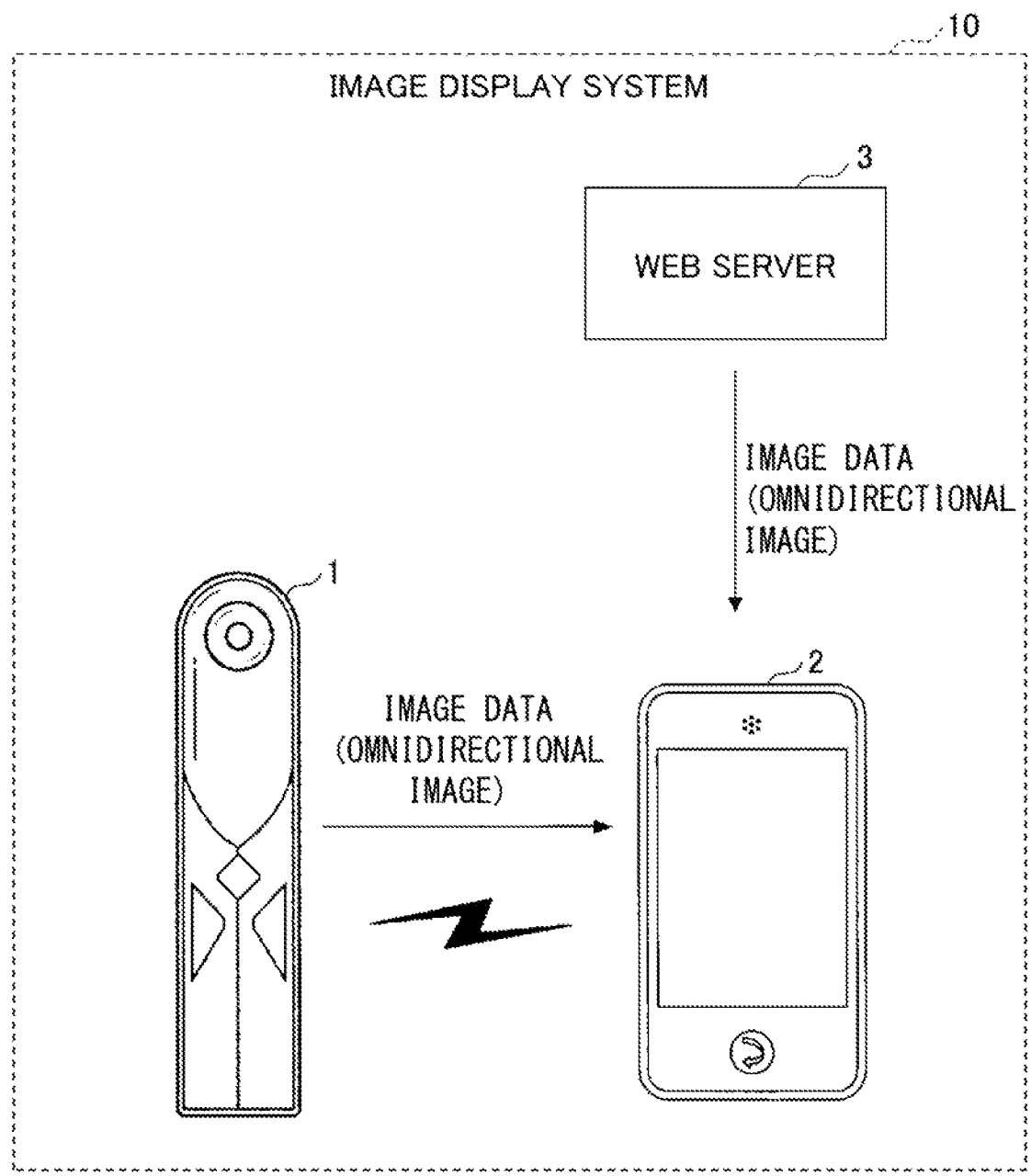
FIG. 1 is a diagram showing an example of an image display system according to an embodiment.

FIG. 1 shows an image display system 10 according to an embodiment. As shown in FIG. 1, the image display system 10 includes an imaging device 1, an information processing apparatus 2, and a web server 3. In the image display system 10, the imaging device 1 and the information processing apparatus 2 are interconnected by wired or wireless communication, and the web server 3 and the information processing apparatus 2 are interconnected by wired or wireless communication.

The imaging device 1 is configured to take an omnidirectional image and supply the omnidirectional image to the information processing apparatus 2. Note that the image taken by the imaging device 1 is not limited to the omnidirectional image and may be a panoramic image or any other image. The information processing apparatus 2 may be an apparatus, such as a smart phone, a tablet, a mobile phone, or a personal computer (PC). The information processing apparatus 2 is configured to acquire an image from the imaging device 1 or the web server 3 and display the image on the information processing apparatus 2, which is viewed by a user. The web server 3 is configured to acquire and accumulate images beforehand and supply the images to the information processing apparatus 2.

Figure 2A:
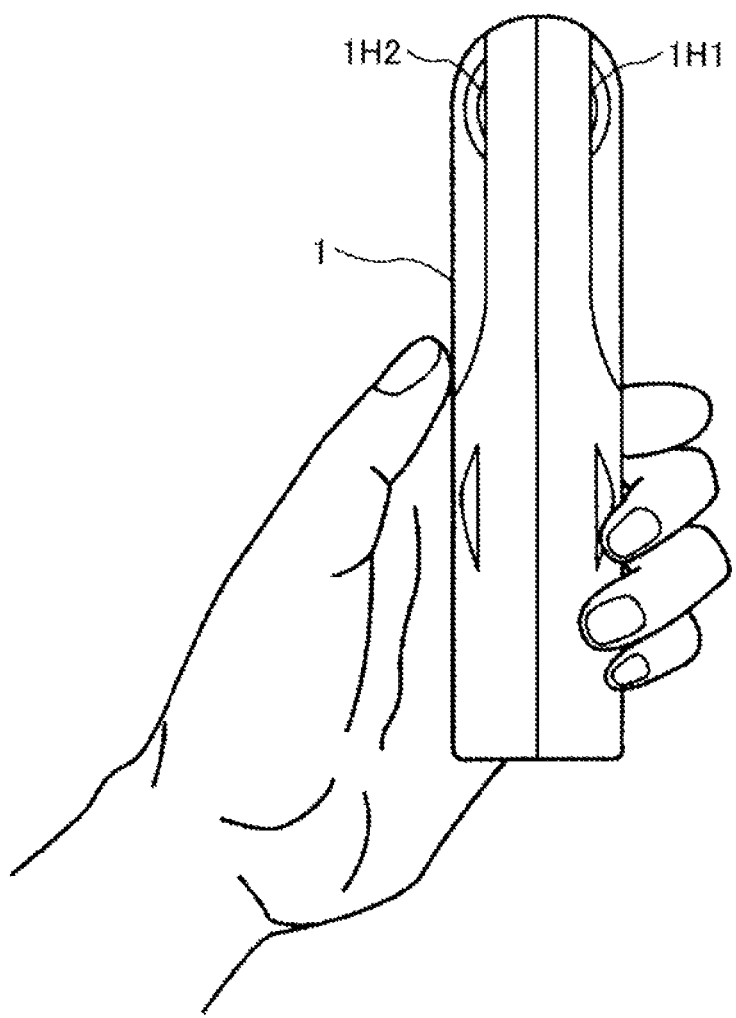
FIG. 2A is a diagram showing an outer appearance of an imaging device.
Figure 2B:
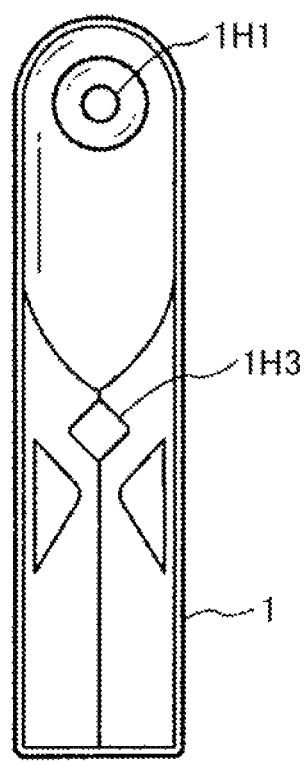
FIG. 2B is a diagram showing an outer appearance of the imaging device.
Figure 2C:
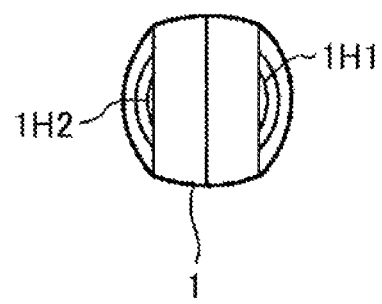
FIG. 2C is a diagram showing an outer appearance of the imaging device.

FIGS. 2A to 2C are diagrams showing an outer appearance of the imaging device 1. FIG. 2A shows a state in which a user holds the imaging device 1 by hand. FIG. 2B is a right-hand side view of the imaging device 1 shown in FIG. 2A. FIG. 2C is a top view of the imaging device 1 shown in FIG. 2A.

The imaging device 1 includes a front imaging element 1H1 disposed at an upper end portion of one surface of a casing, and a rear imaging element 1H2 disposed at an upper end portion of the opposite surface of the casing. Further, the imaging device 1 includes a switch 1H3 disposed at a central portion of the casing. The switch 1H3 is provided to control the imaging device 1 to perform imaging upon depression of the switch 1H3.

Figure 3:
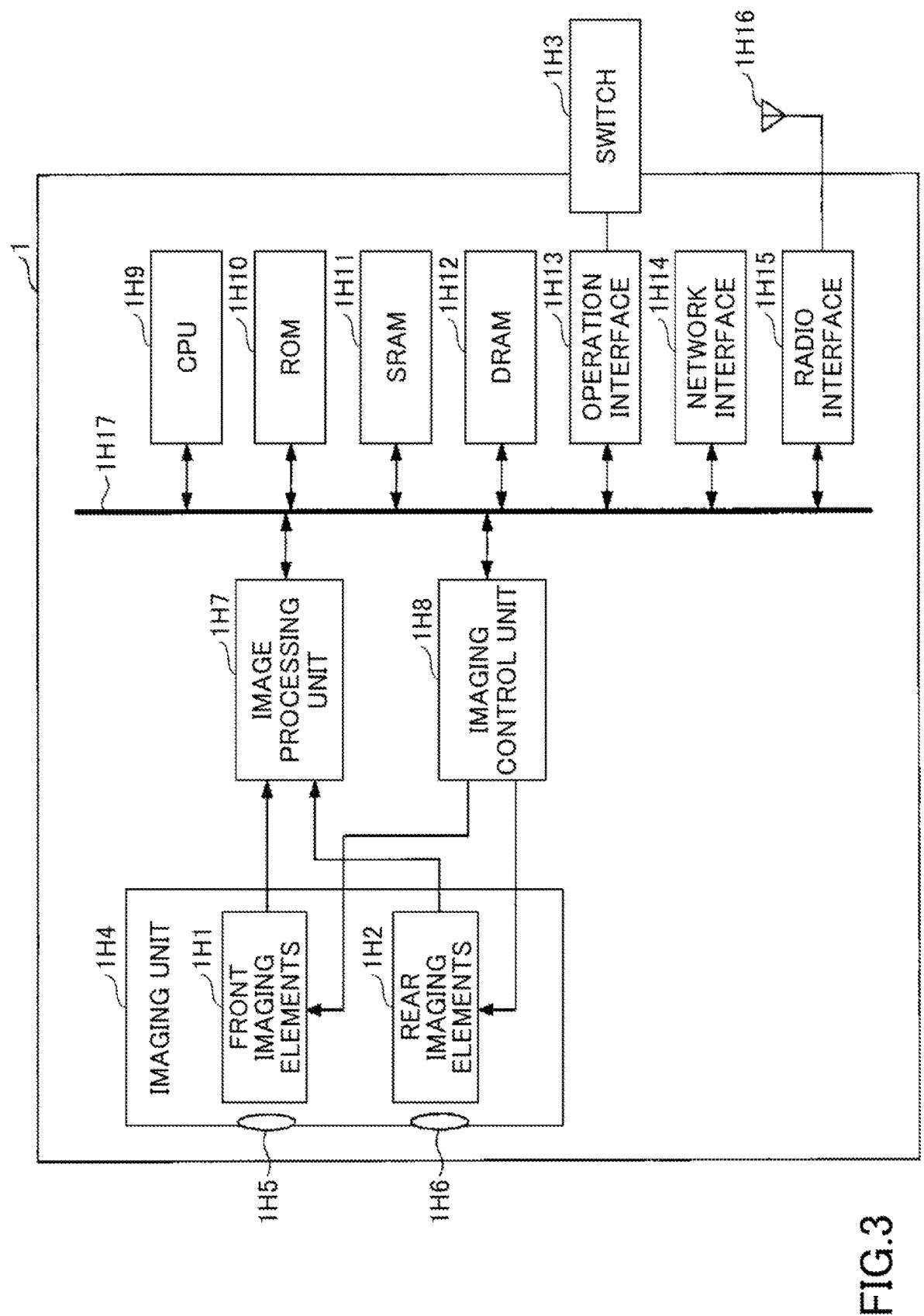
FIG. 3 is a block diagram showing a hardware configuration of the imaging device.

FIG. 3 shows a hardware configuration of the imaging device 1. As shown in FIG. 3, the imaging device 1 includes an imaging unit 1H4, an image processing unit 1H7, and an imaging control unit 1H8. The imaging unit 1H4 includes a front imaging element 1H1, a rear imaging element 1H2, a lens 1H5 disposed at the front imaging element 1H1, and a lens 1H6 disposed at the rear imaging element 1H2. The image processing unit 1H7 is configured to generate an omnidirectional image based on the images taken by the front imaging element 1H1 and the rear imaging element 1H2. The imaging control unit 1H8 is configured to control imaging of each of the front imaging element 1H1 and the rear imaging element 1H2.

Further, the imaging device 1 includes a central processing unit (CPU) 1H9, a read-only memory (ROM) 1H10, a static random access memory (SRAM) 1H11, a dynamic random access memory (DRAM) 1H12, an operation interface 1H13, a network interface 1H14, a radio interface 1H15, and an antenna 1H16, which are interconnected by a bus 1H17. These elements are provided to perform a process for supplying a taken omnidirectional image to an external device, and to control the image processing unit 1H7 and the imaging control unit 1H8.

Figure 4:
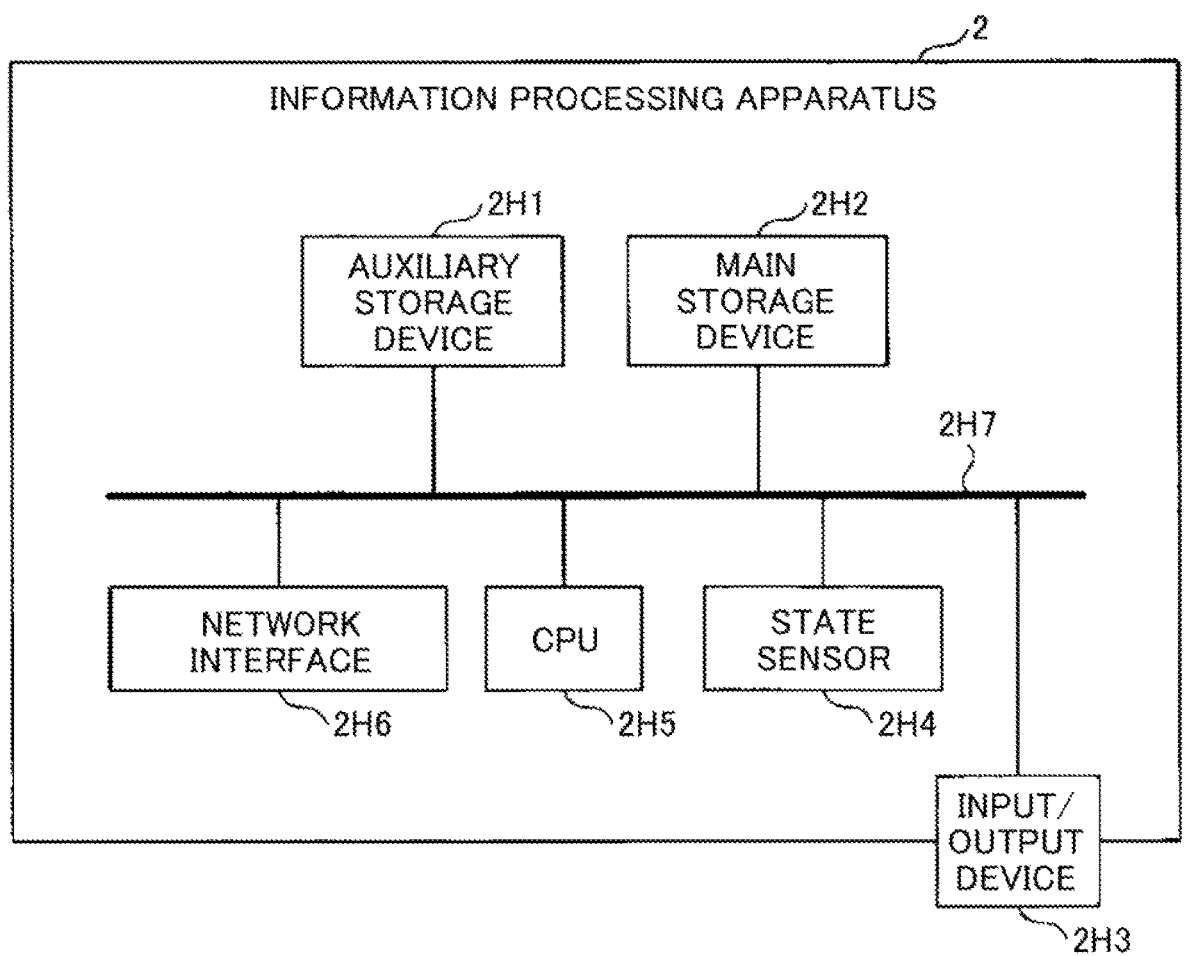
FIG. 4 is a block diagram showing a hardware configuration of an information processing apparatus.

FIG. 4 shows a hardware configuration of the information processing apparatus 2. As shown in FIG. 4, the information processing apparatus 2 includes an auxiliary storage device 2H1, a main storage device 2H2, an input/output device 2H3, a state sensor 2H4, a CPU 2H5, and a network interface 2H6, which are interconnected by a bus 2H7.

The state sensor 2H4 includes an angle sensor and an acceleration sensor, and these sensors are provided to detect a portrait orientation or a landscape orientation of the information processing apparatus 2. The input/output device 2H3 includes a display unit for displaying a screen, and a touch panel for receiving a user operation. The CPU 2H5 is a processor configured to control acquisition of an image from the imaging device 1 or the web server 3, and displaying of an image in a screen.

Figure 5:
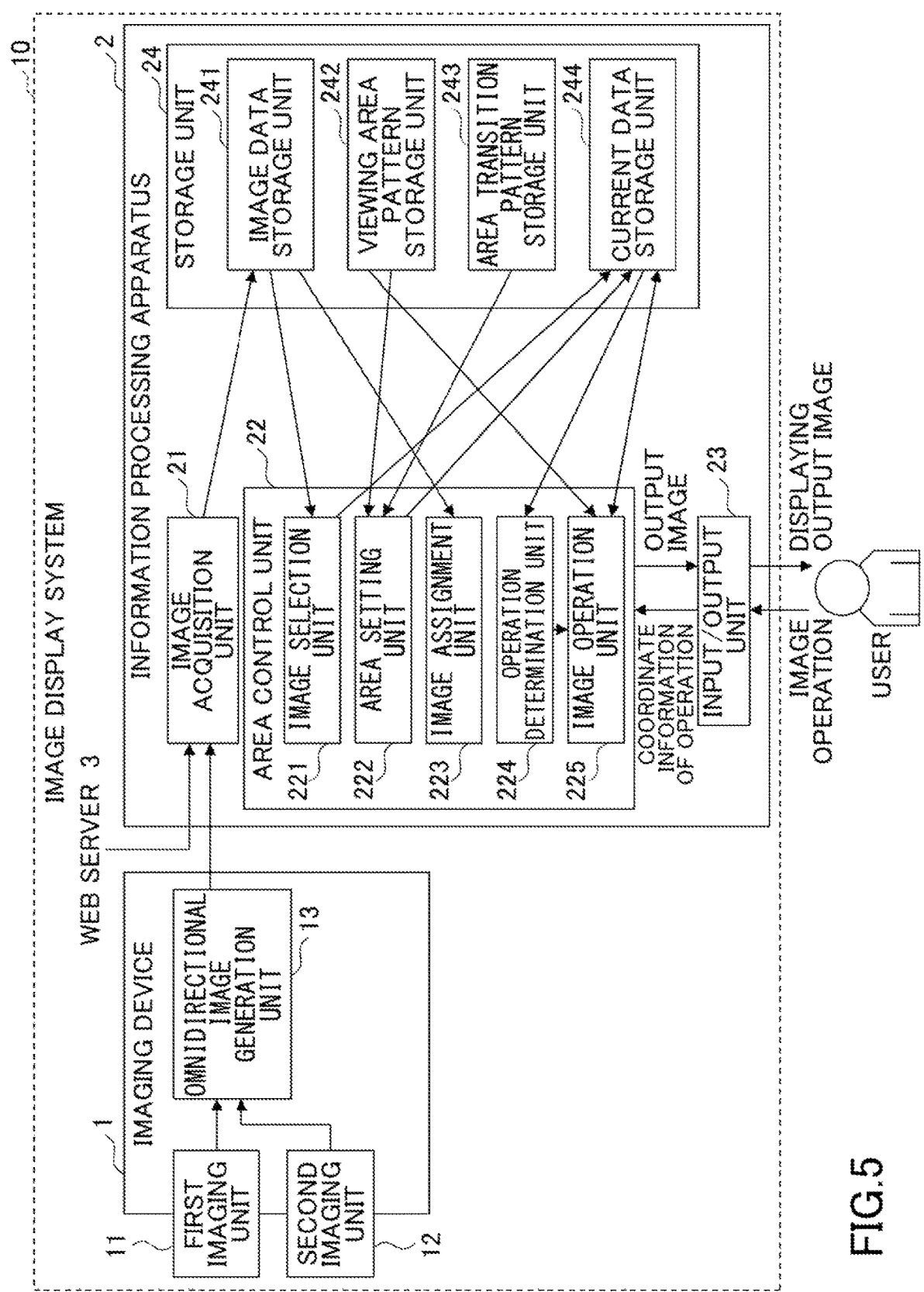
FIG. 5 is a diagram showing a software configuration of the image display system.

FIG. 5 shows a software configuration of the image display system 10. As shown in FIG. 5, the imaging device 1 includes a first imaging unit 11, a second imaging unit 12, and an omnidirectional image generation unit 13. The first imaging unit 11 corresponds to the hardware of the front imaging element 1H1 (FIG. 3), and the second imaging unit 12 corresponds to the hardware of the rear imaging element 1H2 (FIG. 3). The omnidirectional image generation unit 13 corresponds to the hardware of the image processing unit 1H7 (FIG. 3).

As shown in FIG. 5, the information processing apparatus 2 includes an image acquisition unit 21, an area control unit 22, an input/output unit 23, and a storage unit 24. The area control unit 22 includes an image selection unit 221, an area setting unit 222, an image assignment unit 223, an operation determination unit 224, and an image operation unit 225. The storage unit 24 includes an image data storage unit 241, a viewing area pattern storage unit 242, an area transition pattern storage unit 243, and a current data storage unit 244.

The image acquisition unit 21 is configured to acquire an image from the imaging device 1 or the web server 3, and store the image into the image data storage unit 241.

The area control unit 22 is configured to perform a process for managing viewing areas of a screen, for displaying an image in the viewing areas of the screen, for receiving from a user an operation (moving, resizing, etc.) on the displayed image, and for reflecting the user operation in the displayed image.

The image selection unit 221 is configured to prompt a user to select an image to be displayed from among the images stored in the image data storage unit 241. The image selection unit 221 is configured to store an image ID which identifies the selected image into the current data storage unit 244 as a current data item.

The area setting unit 222 is configured to receive from a user a selection of a viewing area pattern from among the viewing area patterns stored in the viewing area pattern storage unit 242, and set the viewing areas according to the selected viewing area pattern. The area setting unit 222 is configured to store data of the selected viewing area pattern and data of a corresponding area transition pattern (which is stored in the area transition pattern storage unit 243 when the user operation covers two or more viewing areas) into the current data storage unit 244 as current data items.

The image assignment unit 223 is configured to acquire an image from the image data storage unit 241 and assign the image to the viewing areas set by the area setting unit 222. The image assigned to the viewing areas may include image portions in different viewing areas of the acquired image and may cover a partially overlapping viewing area.

The operation determination unit 224 is configured to determine a user operation on the image. At this time, the operation determination unit 224 refers to the operation coordinate information received from the input/output unit 23 and to the current data stored in the current data storage unit 244, in order to determine which viewing area of the viewing areas corresponds to the image on which the user operation is performed, and determine whether the user operation is an operation covering two or more viewing areas. Note that the user operation on the image may include an operation to touch the screen by a finger and an operation to touch the screen by an electronic pen, a mouse, etc.

The image operation unit 225 is configured to reflect the user operation in the image data of the image data storage unit 241 based on the operation determined by the operation determination unit 224. Further, the image operation unit 225 is configured to reflect, in the current data of the current data storage unit 244, a direction and a viewing angle of the image having been varied by the user operation.

The input/output unit 23 is configured to receive a user operation and supply to the area control unit 22 the operation coordinate information related to the screen in which the user operation is performed. Further, the input/output unit 23 is configured to receive an output image from the area control unit 22 and display a screen including the output image.

FIG. 6 shows an example of a viewing area pattern table 242A stored in the viewing area pattern storage unit 242. The contents of the viewing area pattern table 242A may be stored in the viewing area pattern storage unit 242 upon installation of an application program for implementing the image acquisition unit 21, the area control unit 22, and the input/output unit 23. Subsequently, when a data change or a data addition to the viewing area pattern table 242A is provided, the data change or the data addition is acquired from a server device or the like so that the contents of the viewing area pattern table 242A may be updated.

As shown in FIG. 6, the viewing area pattern table 242A includes data items of "VIEWING AREA PATTERN", "NUMBER OF AREAS", "RANGE OF IMAGE (INITIAL VALUE)", "ARRANGEMENT PATTERN", "STANDARD", "ASSOCIATION DISPLAY DIRECTION", etc.

The "VIEWING AREA PATTERN" indicates identification information of each of viewing area patterns. The "NUMBER OF AREAS" indicates the number of viewing areas included in a corresponding one of the viewing area patterns. The "RANGE OF IMAGE (INITIAL VALUE)" indicates an initial value of a range of an image displayed in each of the viewing areas in the corresponding viewing area pattern. In a case of an omnidirectional image, the image is determined by a horizontal angle $\theta$, a vertical angle $\varphi$, and a viewing angle $\alpha$. Note that the range of the image is varied when moving or resizing of the image is performed by the user operation, but the varied range of the image is reflected in the current data.

The "ARRANGEMENT PATTERN" indicates how two or more viewing areas are arranged in a screen. In this embodiment, two or more candidates for the arrangement pattern are provided to enable a user to select a desired one of the candidates. The selected arrangement pattern is reflected in the current data.

Figure 7:
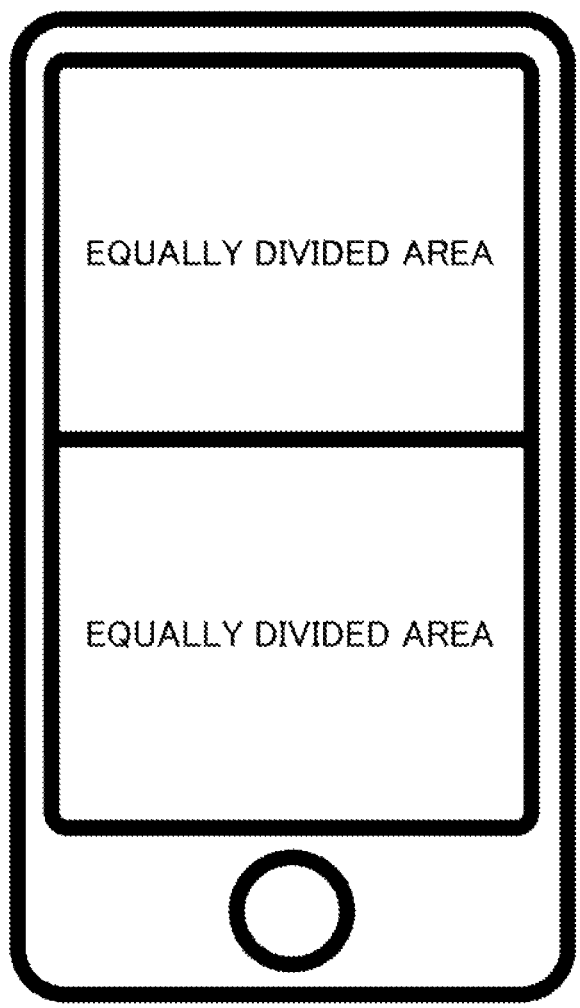
FIG. 7 is a diagram showing an example of an arrangement pattern of viewing areas.
Figure 8:
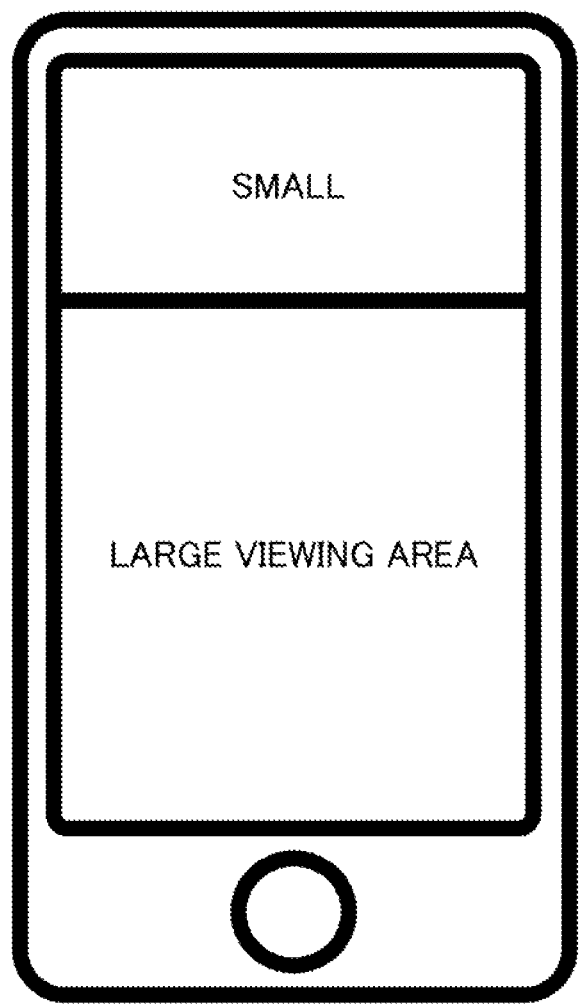
FIG. 8 is a diagram showing an example of the arrangement pattern of viewing areas.
Figure 9:
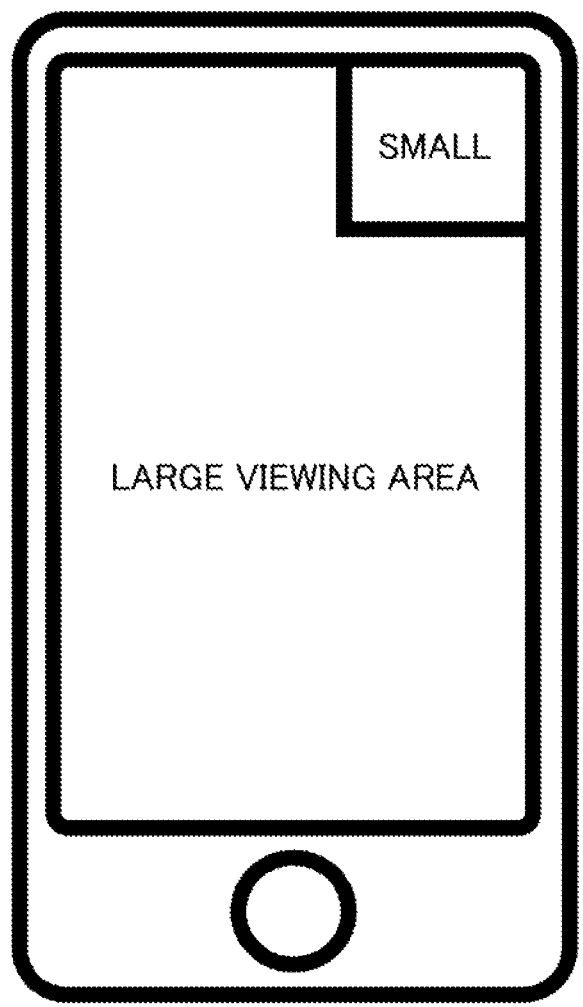
FIG. 9 is a diagram showing an example of the arrangement pattern of viewing areas.
Figure 10:
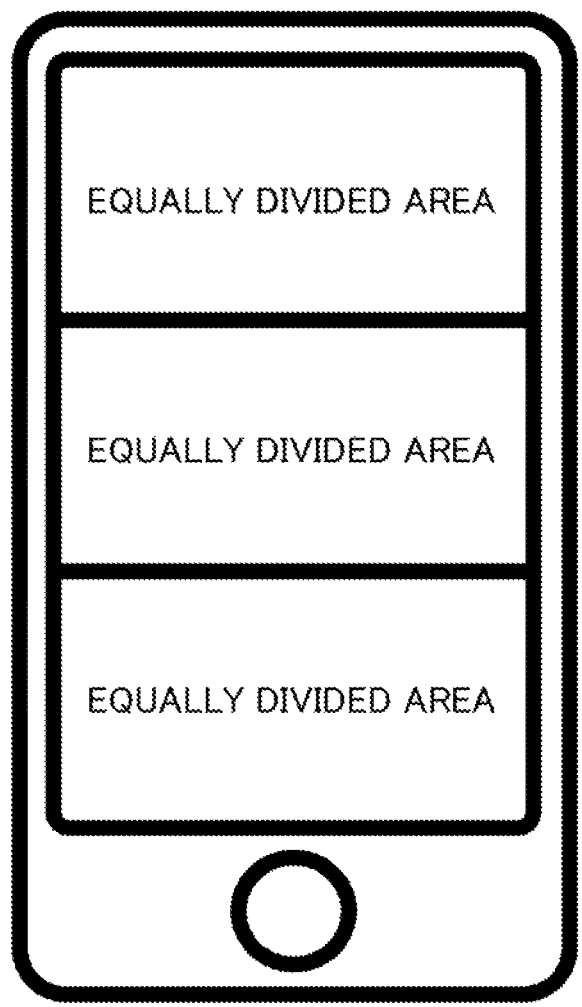
FIG. 10 is a diagram showing an example of the arrangement pattern of viewing areas.
Figure 11:
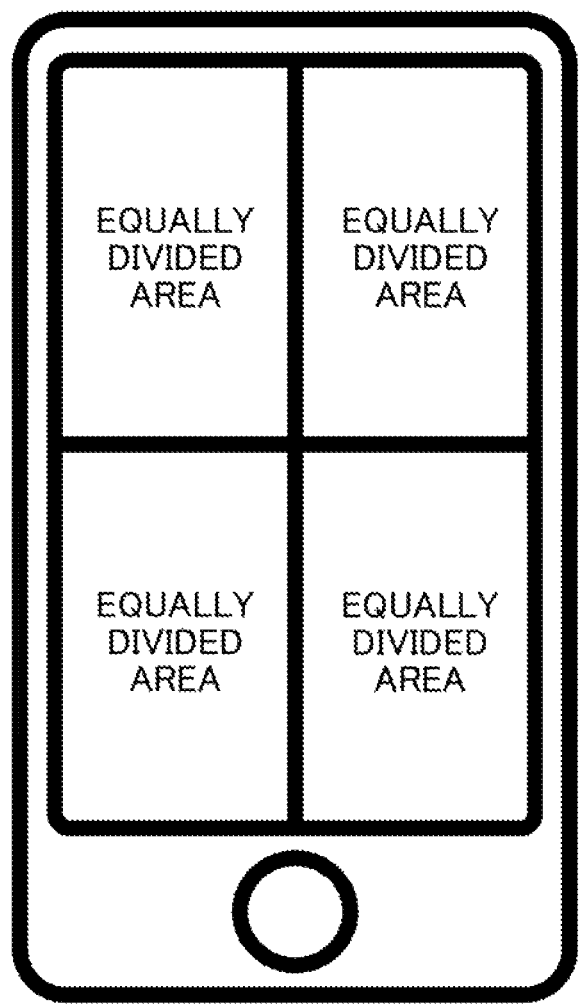
FIG. 11 is a diagram showing an example of the arrangement pattern of viewing areas.
Figure 12:
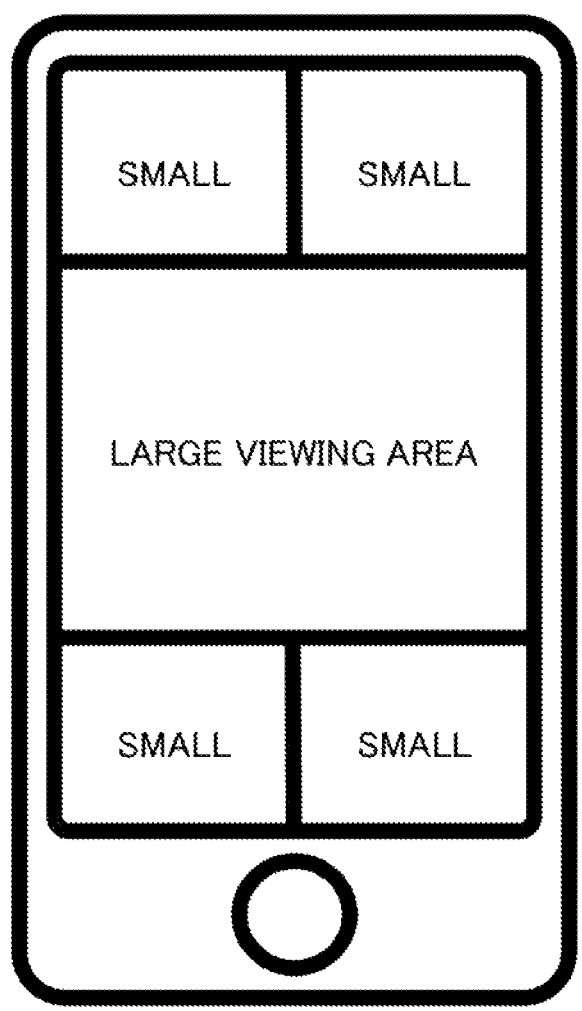
FIG. 12 is a diagram showing an example of the arrangement pattern of viewing areas.

Here, several examples of the arrangement pattern are explained. FIG. 7 shows an example of the arrangement pattern. In this example, the screen is equally divided into two rows (up and down) in portrait orientation so that two viewing areas are provided. FIG. 8 shows an example of the arrangement pattern. In this example, the screen is divided into two rows (up and down) in portrait orientation so that two viewing areas are provided (a lower viewing area is enlarged and an upper viewing area is reduced). FIG. 9 shows an example of the arrangement pattern. In this example, the screen is divided into two areas in portrait orientation so that two viewing areas are provided (a small viewing area is arranged at the upper right corner of the whole screen). FIG. 10 shows an example of the arrangement pattern. In this example, the screen is equally divided into three rows in portrait orientation so that three viewing areas are arrayed in the up/down direction of the screen. FIG. 11 shows an example of the arrangement pattern. In this example, the screen is equally divided into two rows and two columns in portrait orientation so that four viewing areas are provided in a grid formation. FIG. 12 shows an example of the arrangement pattern. In this example, the screen is divided into five areas in portrait orientation, a large viewing area is arranged in the center of the screen, and two small viewing areas (right and left) are arranged in each of an upper portion and a lower portion of the screen so that five viewing areas are provided. FIG. 13 shows an example of the arrangement pattern. In this example, the screen is divided into five areas in landscape orientation, a large viewing area is arranged in the center of the screen, and two small viewing areas (up and down) are arranged in each of a right portion and a left portion of the screen so that five viewing areas are provided.

Referring back to FIG. 6, the arrangement pattern may include a pattern in which all of the viewing areas or some of the viewing areas are resized. In this case, the size of the viewing areas may be varied by a user operation. An operation to resize the viewing areas depends on an operation interface (e.g., dragging an end portion of a viewing area) provided by an operating system (OS) of the information processing apparatus 2. The resized viewing areas are reflected in the current data. Further, the positions of all or some of the viewing areas may be moved by a user operation.

In addition, the viewing area may be copied or deleted. The copied viewing area may inherit the characteristics of the original viewing area and may be reflected in the current data. The copied viewing area may be newly registered in the viewing area pattern table 242A. The copied viewing area may be arranged in a vacant area in the screen or overlaid on the existing viewing area. The arrangement may be set up such that the copied viewing area may not be overlaid on the existing viewing area. In this case, the position where the copied viewing area is arranged is adjusted relative to the existing viewing area.

The "STANDARD" indicates a standard viewing area when the association relationship between viewing areas is defined. The "ASSOCIATION DISPLAY DIRECTION" indicates a direction of association display of the association viewing area relative to the standard viewing area. In moving and resizing operations, each of the same direction and the opposite direction may be selected as the association display direction. The "ASSOCIATION DISPLAY DIRECTION" may be set up such that the selection is enabled for each of the association viewing areas.

Note that the viewing area pattern table 242A may be implemented by inserting corresponding codes in an image display program according to the invention, instead of using a table form.

FIG. 14 shows an example of an area transition pattern table 243A stored in the area transition pattern storage unit 243. The contents of the transition pattern table 243A may be stored in the area transition pattern storage unit 243 upon installation of an application program for implementing the image acquisition unit 21, the area control unit 22, and the input/output unit 23. Subsequently, when a data change or a data addition to the area transition pattern table 243A is provided, the data change or the data addition is acquired from a server device or the like so that the contents of the transition pattern table 243A may be updated.

As shown in FIG. 14, the area transition pattern table includes data items of "AREA TRANSITION PATTERN", "NUMBER OF AREAS", "TRANSITION DIRECTION", "TRANSITION OF OPERATIONS", "TARGET OF ASSOCIATION", etc.

The "AREA TRANSITION PATTERN" indicates identification information of each of area transition patterns. The "NUMBER OF AREAS" indicates the number of viewing areas to which a corresponding one of the area transition patterns is applied. The "TRANSITION DIRECTION" indicates a directional relationship between viewing areas covered by a user operation. Specifically, in the "TRANSITION DIRECTION", a "LEFT<=> RIGHT" indicates that a user operation covers viewing areas which adjoin in a right/left direction, an "UP<=> DOWN" indicates that a user operation covers viewing areas which adjoin in an up/down direction, and a "DIAGONAL" indicates that a user operation covers viewing areas which adjoin in a diagonal direction (both in a right/left direction and in an up/down direction).

The "TRANSITION OF OPERATIONS" indicates information for treating as a user operation in a viewing area which a starting point of the touching operation performed belongs to when the user operation indicated by the "TRANSITION DIRECTION" is performed and the relationship between the standard area and the association area is changed. The "TARGET OF ASSOCIATION" indicates the contents of association in which moving quantities (moving direction, moving amount) and resizing quantities (resizing amount) are set.

Note that the area transition pattern table 243A may be implemented by inserting corresponding codes in the image display program according to the invention, instead of using a table form.

FIG. 15 shows an example of the current data stored in the current data storage unit 244. As shown in FIG. 15, the current data stored in the current data storage unit 244 includes an image ID of an image selected by a user, data items of the viewing area pattern selected from the viewing area pattern table 242A (FIG. 6) by the user, and data items of the area transition pattern corresponding to the viewing area pattern in the area transition pattern table 243A (FIG. 14).

Figure 16:
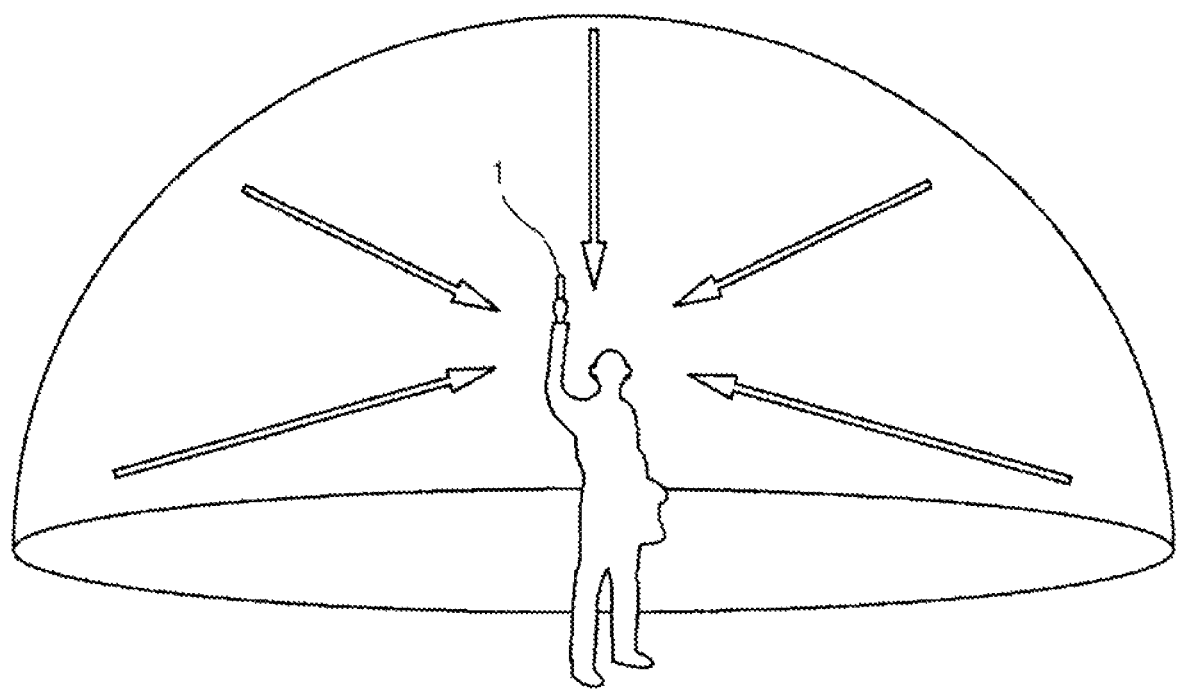
FIG. 16 is a diagram showing an imaging action performed with the imaging device.

Next, FIG. 16 shows an imaging action performed using the imaging device 1. As shown in FIG. 16, a user holds the imaging device 1 by hand and takes an image by pressing the switch 1H3 (FIG. 2). The imaging device 1 is configured to take an omnidirectional image covering all the directions of the imaging device 1 by using the front imaging element 1H1 (FIG. 2) and the rear imaging element 1H2 (FIG. 2).

Figure 17:
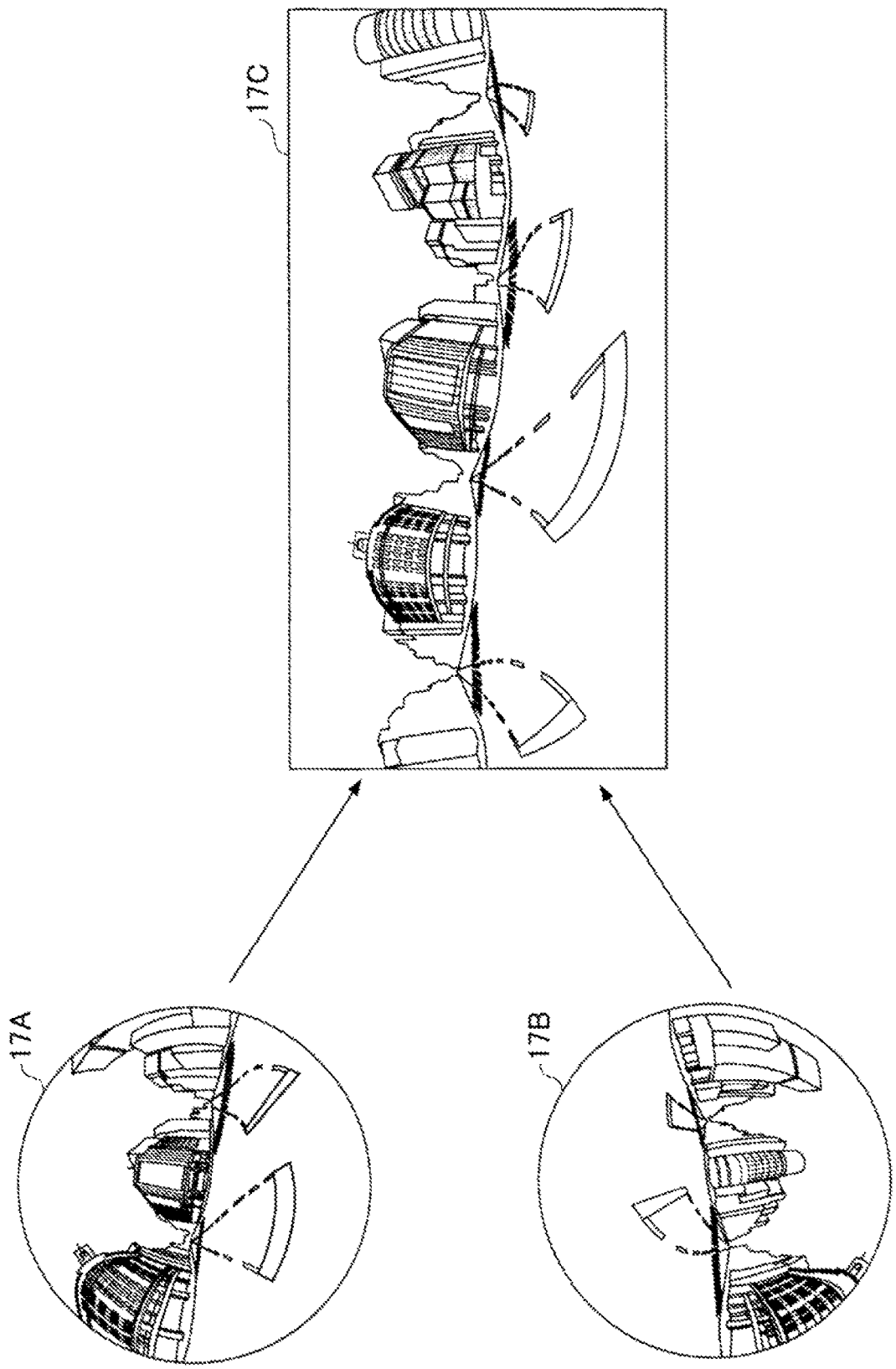
FIG. 17 is a diagram showing an omnidirectional image produced by the imaging device.

FIG. 17 shows an example of images taken by the imaging device 1. As shown in FIG. 17, a first image 17A is taken by the front imaging element 1H1 of the imaging device 1 and a second image 17B is taken by the rear imaging element 1H2 of the imaging device 1. The top and bottom of the second image 17B are opposite to those of the first image 17A. This is because a simplified optical system is used in this example. In the simplified optical system, light beams entering from lenses disposed in front of and behind the casing are reflected upward and downward by the front and rear surfaces of a single mirror, and the front imaging element 1H1 and the rear imaging element 1H2 are disposed on the optical axes of the reflected light beams. As shown in FIG. 17, the first and second images 17A and 17B are combined to generate an omnidirectional image 17C according to the equidistant cylindrical projection or the Mercator projection.

Figure 18:
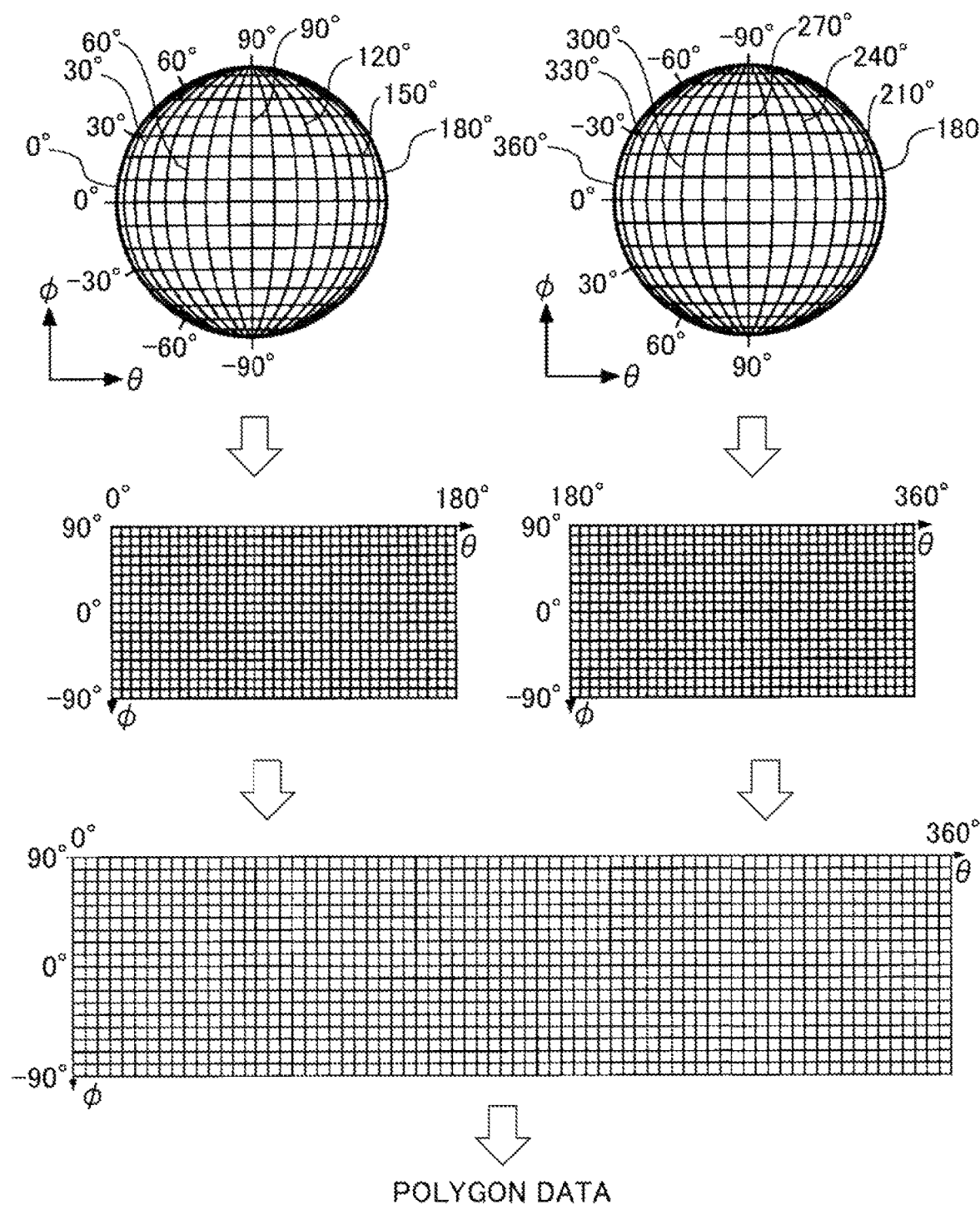
FIG. 18 is a diagram showing an example of generation of an omnidirectional image.

FIG. 18 shows an example of generation of an omnidirectional image by the omnidirectional image generation unit 13 (FIG. 5) of the imaging device 1. In the example of FIG. 18, a correspondence relationship between the horizontal angle θ and the vertical angle φ with respect to respective positions of pixels of an image obtained from each of the front imaging element 1H1 and the rear imaging element 1H2 is shown in the top row portion of FIG. 18. The top and bottom of the left image in the top row portion of FIG. 18 are opposite to the top and bottom of the right image, and the positive/negative of the angle φ of the left image are reverse to that of the right image.

The pixels of the images in the top row portion of FIG. 18 are transformed based on a look-up table to transform the angle θ and the angle φ into the Cartesian coordinates to generate images in which the angle θ ranges from 0 to 180 degrees as shown in the middle row portion of FIG. 18. Next, the two images in the middle row portion are combined to generate an image in which the angle θ ranges from 0 to 360 degrees as shown in the bottom row portion of FIG. 18. Then, the image data of this image is decomposed into triangular polygon data, and the polygon data is associated with the angle θ and the angle φ so that three-dimensional (3D) data is created. The 3D data provides an omnidirectional image.

Figure 19A:
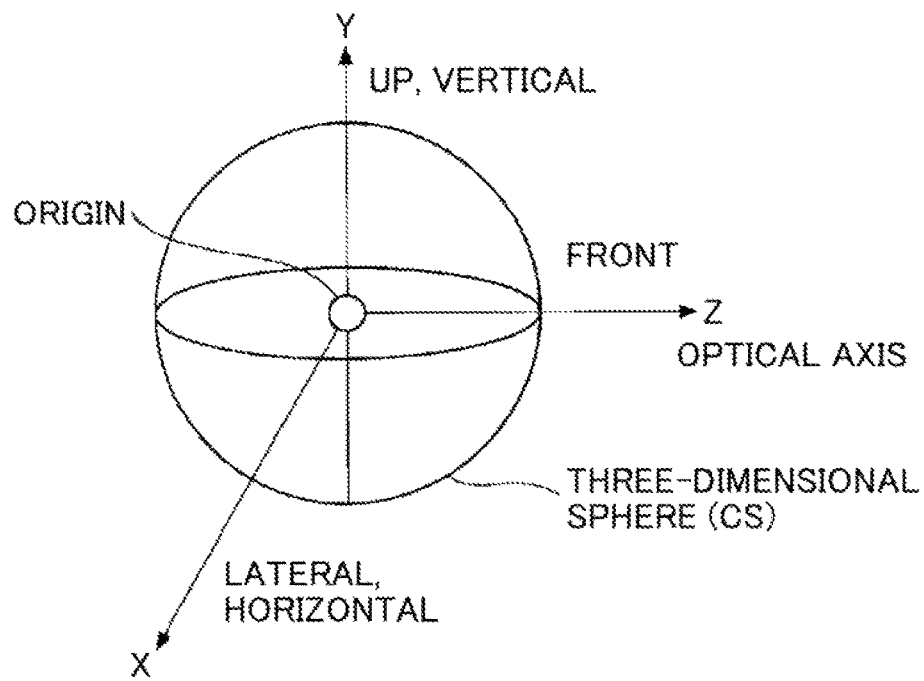
FIG. 19A is a diagram showing a relationship between an X-axis, a Y-axis, and a Z-axis.
Figure 19B:
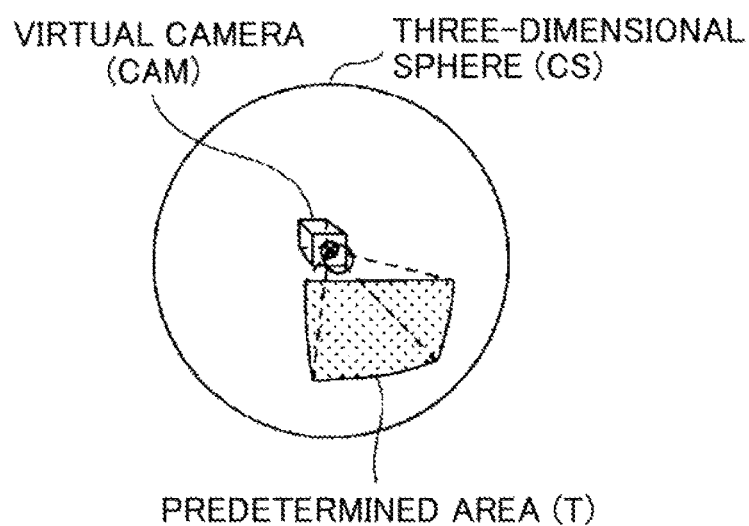
FIG. 19B is a diagram showing an arrangement of a virtual camera for capturing a cutout of a display image.
Figure 19C:
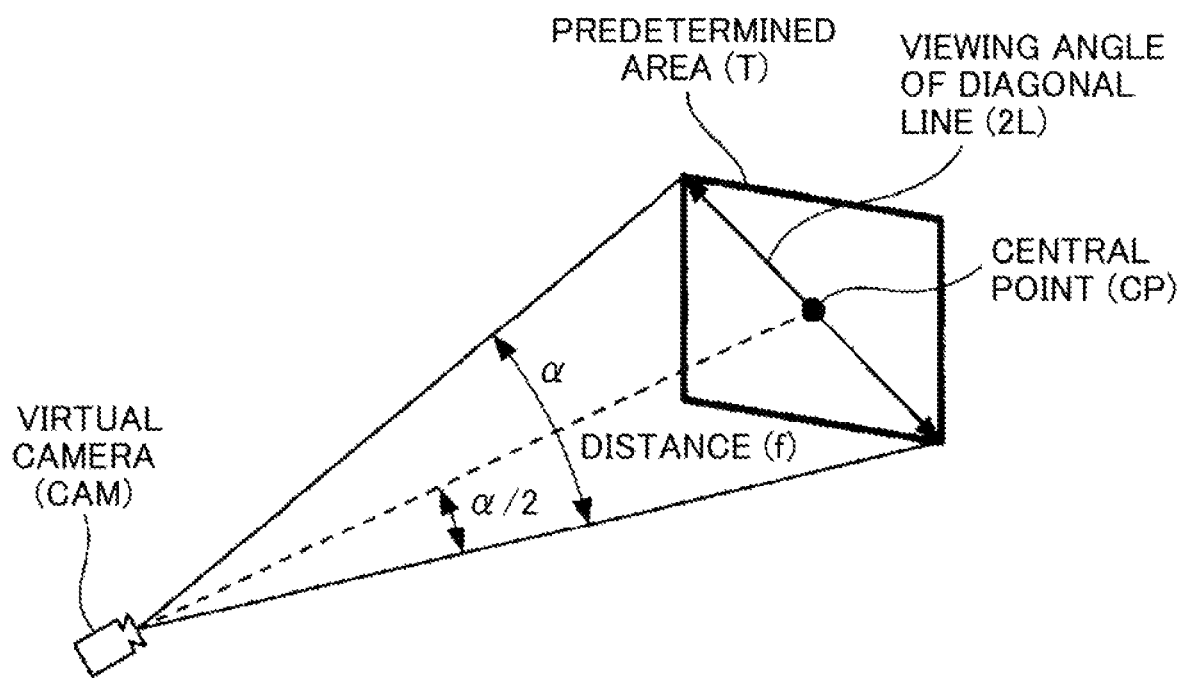
FIG. 19C is a diagram showing a field of view of the virtual camera.

FIGS. 19A to 19C are diagrams showing a cutout of a display image. FIG. 19A shows a relationship between an X-axis, a Y-axis, and a Z-axis. A three-dimensional sphere CS is provided to define a spherical surface on which an omnidirectional image is virtually affixed. FIG. 19B shows that a virtual camera CAM is disposed within the three-dimensional sphere CS and cuts out of the spherical surface a display image (which corresponds to a partial image of the omnidirectional image) in a predetermined area T on the spherical surface. FIG. 19C shows a field of view of the virtual camera CAM. As shown in FIG. 19C, an angle which faces across the ends of a diagonal line of the predetermined area T is defined as being a viewing angle α of the virtual camera CAM.

Figure 20:
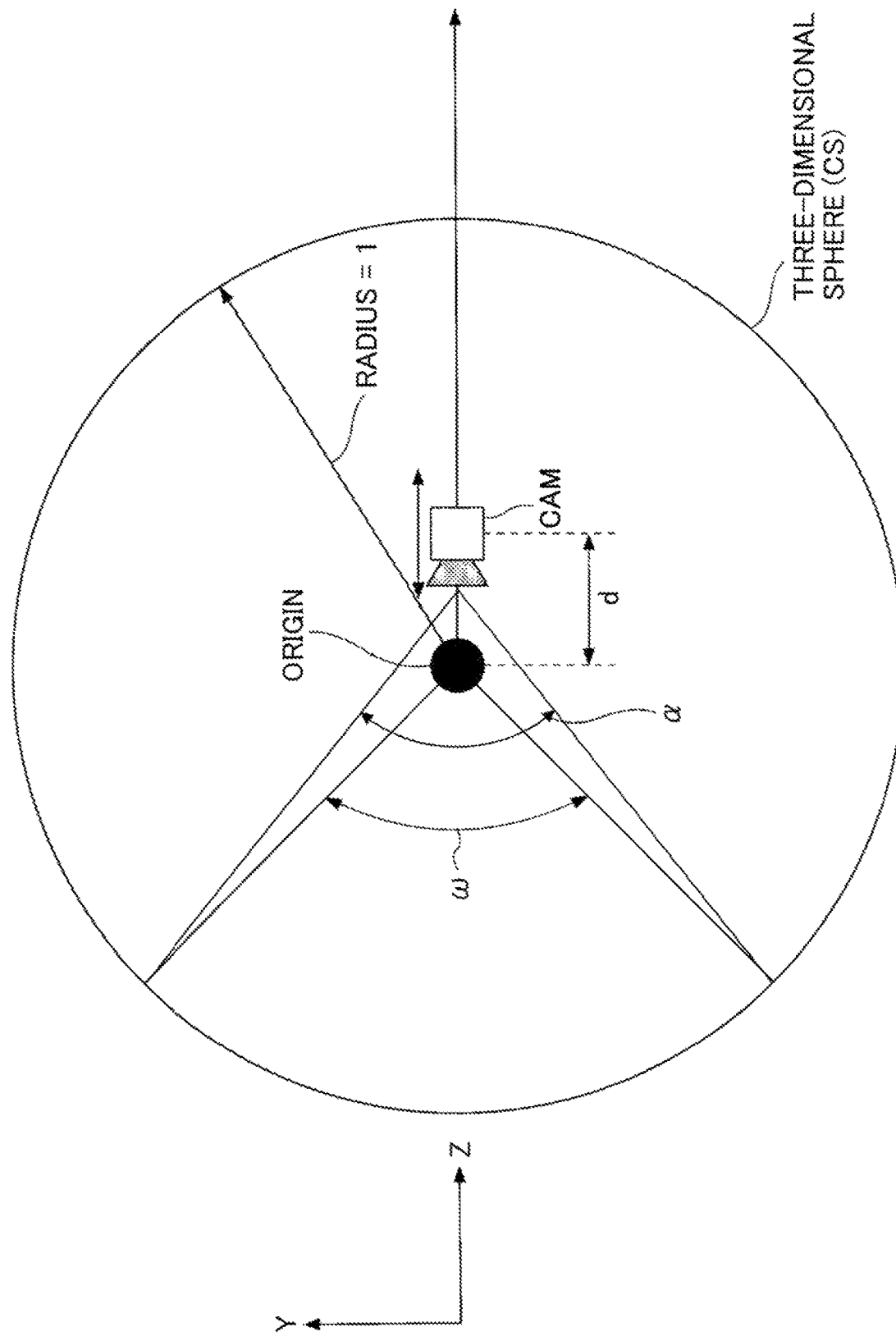
FIG. 20 is a diagram for explaining a cutout of a display image.

FIG. 20 shows a relationship between a position of the virtual camera CAM and the origin of the three-dimensional sphere CS. As shown in FIG. 20, the virtual camera CAM generally is moved back along the Z-axis (or along the optical axis) by a distance d from the origin of the three-dimensional sphere CS, and the viewing angle α is measured around the position of the virtual camera CAM at the distance d. Here, it is assumed that, when the position of the virtual camera CAM at the distance d lies inside the three-dimensional sphere CS, the positions where the two rays of the viewing angle α intersect with the three-dimensional sphere CS are in agreement with the positions where the two rays of a viewing angle ω around the origin intersect with the three-dimensional sphere CS, and when the position of the virtual camera CAM at the distance d lies outside the three-dimensional sphere CS, the two rays of the viewing angle α are tangential to the three-dimensional sphere CS. When the distance d is equal to 0, the viewing angle α is in agreement with the viewing angle ω around the origin. The viewing angle ω, the viewing angle α, and the distance d are controlled according to a resizing factor, and if the viewing angle ω, the viewing angle α, and the distance d are controlled to reduce the image displayed in size, the outline of the image displayed becomes circular.

Figure 21:
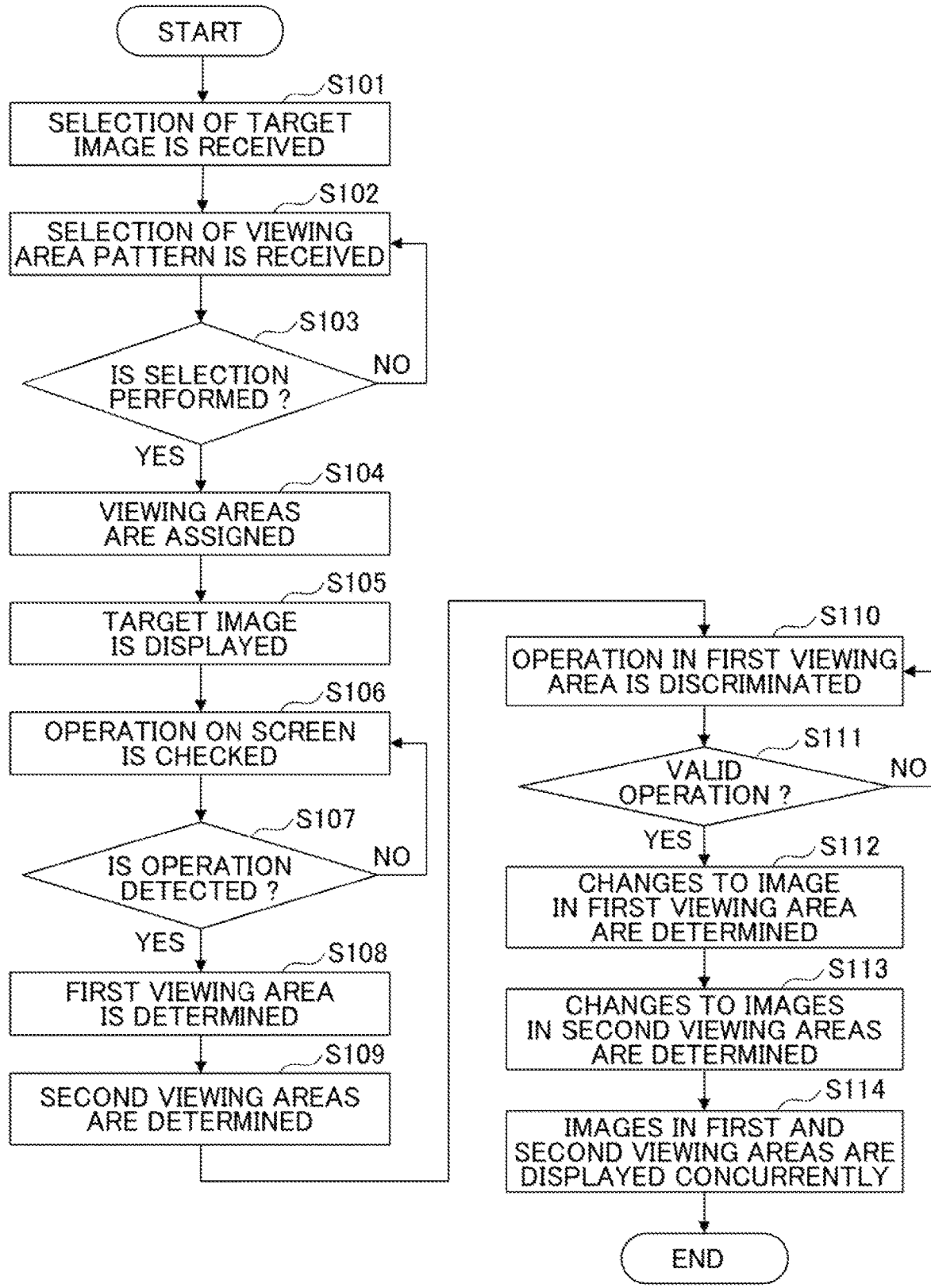
FIG. 21 is a flowchart for explaining a process performed by the information processing apparatus.

FIG. 21 is a flowchart for explaining a process performed by the information processing apparatus 2.

Upon a start of the process shown in FIG. 21, the image selection unit 221 of the information processing apparatus 2 provides a user with a list of the images stored in the image data storage unit 241, and receives from the user a selection of a target image from among the images of the list (step S101). The image data storage unit 241 stores an image ID of the selected target image into the current data storage unit 244 as a current data item.

Subsequently, the area setting unit 222 provides the user with a list of viewing area pattern candidates from the viewing area pattern table 242A of the viewing area pattern storage unit 242, and receives from the user a selection of a viewing area pattern from among the candidates of the list (step S102). The area setting unit 222 determines whether the selection of the viewing area pattern is received from the user (step S103). If it is determined that the selection of the viewing area pattern is received from the user (YES of step S103), the image selection unit 221 stores the data items of the viewing area pattern and the corresponding area transition pattern into the current data storage unit 244 as current data items.

In the present example, the viewing area pattern is selected by the user. Alternatively, the information processing apparatus 2 may be configured so that the viewing area pattern is determined appropriately based on the features or characteristics of the image to be displayed. For example, the viewing area pattern may be determined based on the result of analysis of a color tone or a time change of the image, the assigned feature information or identification information such as a tag. In this case, it is conceivable that for an image lacking variation, a viewing area pattern with a small number of viewing areas must be determined in view of high visibility, and for an image having various changes in different directions, a viewing area pattern with a large number of viewing areas must be determined in view of the necessity of checking the details.

Subsequently, the image assignment unit 223 performs assignment of the viewing areas based on the range (initial value) of the image of the determined viewing area pattern (step S104) and displays the target image (step S105). Note that the image assignment unit 223 determines whether the information processing apparatus 2 is in portrait orientation or in landscape orientation based on an output signal of the state sensor 2H4 (FIG. 4) and displays the target image such that the top and the bottom of the image being displayed conform to the determined orientation of the information processing apparatus 2.

Subsequently, the operation determination unit 224 checks a user operation on the screen (step S106) and determines whether the user operation on the screen is received (step S107). If it is determined that the user operation is received (YES of step S107), the operation determination unit 224 determines a first viewing area which covers a starting point of a touching action of the user operation on the screen based on the coordinate information of the user operation (step S108), and determines second viewing areas other than the first viewing area (step S109).

Subsequently, the operation determination unit 224 discriminates the user operation in the first viewing area based on the number of touch portions and changes of the coordinate information of the user operation (step S110). Specifically, it is discriminated whether the user operation is a slide (swipe) action, a pinch-out action, or a pinch-in action. In this case, the operation determination unit 224 acquires an amount of the user operation in the first viewing area collectively.

Further, the operation determination unit 224 determines whether the operation in the first viewing area is a valid operation (step S111). If it is determined that the operation in the first viewing area is a valid operation (YES of step S111), the operation determination unit 224 determines changes (moving, resizing) to the image in the first viewing area based on the discriminated operation and the acquired amount of the operation (step S112). The operation determination unit 224 determines changes (moving, resizing) to the images in the second viewing areas based on the data item of the association display direction in the viewing area pattern of the stored current data (step S113).

At this time, when all of the viewing areas have the same size, the amount of changes (moving, resizing) to the image in the first viewing area and the amount of changes to the images in the second viewing areas are the same. When the first and second viewing areas have different sizes, the amounts of changes are varied depending on a ratio of a typical length of the first view area and a typical length of the second viewing areas (e.g., a length of a diagonal line in a case of a rectangular area, and a diameter of a circle in a case of a circular area). For example, when the ratio of the typical length of the first viewing area and the typical length of the second viewing areas is 1:0.5, the amount of changes to the second viewing areas is half as large as the amount of changes to the first viewing area.

Further, in determining the changes to the first viewing area and the changes to the second viewing areas at steps S112 and S113, if the user operation covers both the first and second viewing areas, the operation determination unit 224 is configured to determine that a user operation with respect to the earlier touched area of the first and second viewing areas is performed continuously. Namely, when the data item of the transition direction in the area transition pattern of the current data is matched, the operation determination unit 224 determines the standard or association of the first and second viewing areas based on the transition of operations of the current data and determines either the changes to the first viewing area or the changes to the second viewing areas.

Subsequently, the image operation unit 225 applies the changes to each of the image in the first viewing area and the images in the second viewing areas based on the determined changes to the image in the first viewing area and the determined changes to the second viewing areas, and displays the image in the first viewing area and the images in the second viewing areas concurrently (step S114).

Next, several examples of operations and display changes will be described.

Figure 22A:
FIG. 22A is a diagram showing an example of operations and display changes.
Figure 22B:
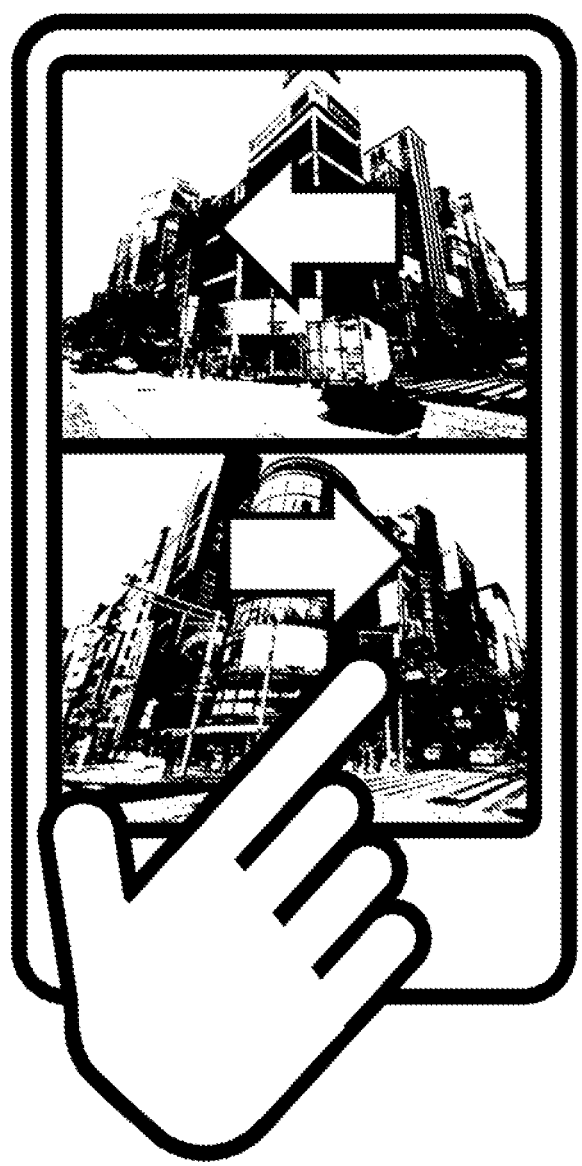
FIG. 22B is a diagram showing an example of operations and display changes.

FIG. 22A and FIG. 22B show a case where the screen is equally divided into two rows (an upper viewing area and a lower viewing area) in portrait orientation and the association display direction of moving in the upper viewing area is set to the direction opposite to the direction of moving in the lower viewing area. In this case, when a rightward sliding operation is performed in the lower viewing area as shown in FIG. 22A, an image in the lower viewing area moves in a right direction while an image in the upper viewing area moves in a left direction as shown in FIG. 22B.

Figure 23A:
FIG. 23A is a diagram showing an example of operations and display changes.
Figure 23B:
FIG. 23B is a diagram showing an example of operations and display changes.

FIG. 23A and FIG. 23B also show the case where the screen is equally divided into the two rows (the upper and lower viewing areas) in portrait orientation and the association display direction of moving in the upper viewing area is set to the direction opposite to the direction of moving in the lower viewing area. In this case, when an upward sliding operation is performed in the lower viewing area as shown in FIG. 23A, an image in the lower viewing area moves in an upward direction while an image in the upper viewing area moves in a downward direction as shown in FIG. 23B.

Figure 24A:
FIG. 24A is a diagram showing an example of operations and display changes.
Figure 24B:
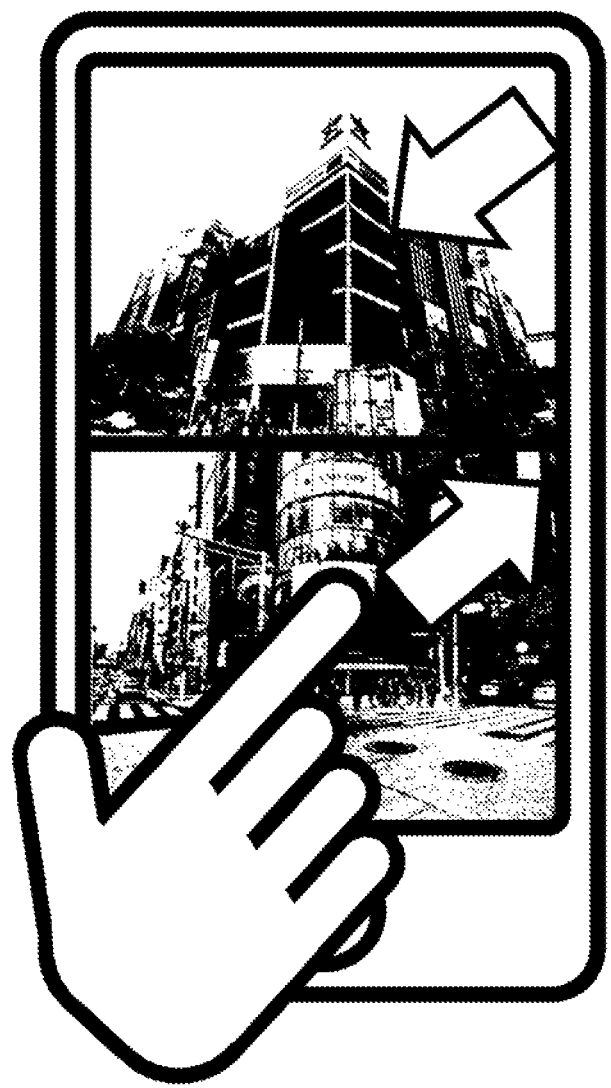
FIG. 24B is a diagram showing an example of operations and display changes.

FIG. 24A and FIG. 24B also show the case where the screen is equally divided into the two rows (the upper and lower viewing areas) in portrait orientation and the association display direction of moving in the upper viewing area is set to the direction opposite to the direction of moving in the lower viewing area. In this case, when a sliding operation in a right upward diagonal direction is performed in the lower viewing area as shown in FIG. 23A, an image in the lower viewing area moves in the right upward diagonal direction while an image in the upper viewing area moves in a left downward diagonal direction as shown in FIG. 24B.

Figure 25A:
FIG. 25A is a diagram showing an example of operations and display changes.
Figure 25B:
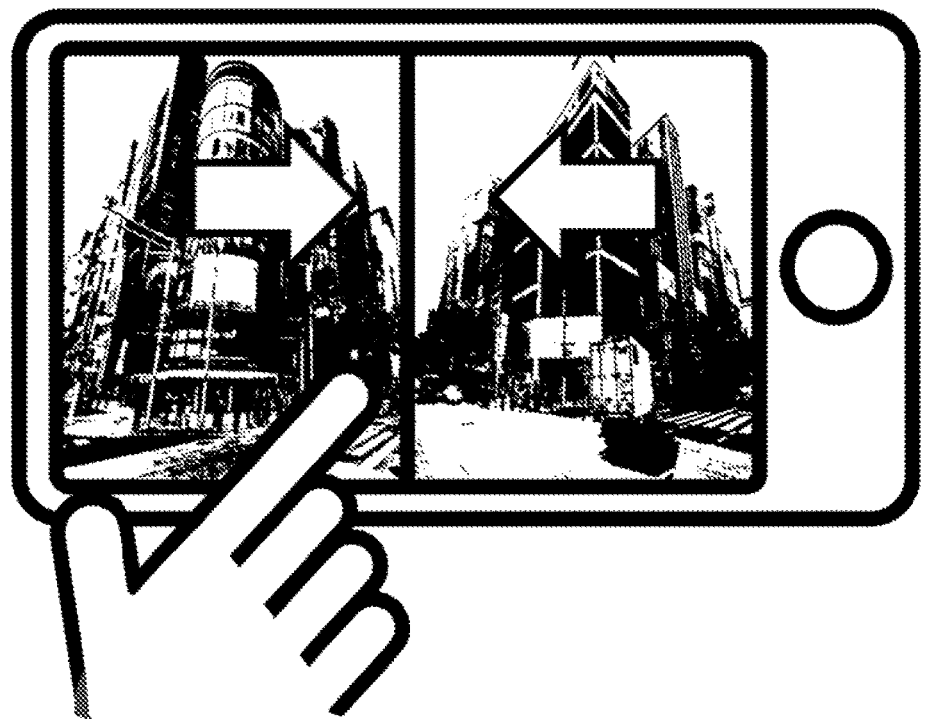
FIG. 25B is a diagram showing an example of operations and display changes.

FIG. 25A and FIG. 25B show a case where the screen is equally divided into two columns (a right viewing area and a left viewing area) in landscape orientation and the association display direction of moving in the right viewing area is set to the direction opposite to the direction of moving in the left viewing area. In this case, when a rightward sliding operation is performed in the left viewing area as shown in FIG. 25A, an image in the left viewing area moves in a right direction while an image in the right viewing area moves in a left direction as shown in FIG. 25B.

Figure 26A:
FIG. 26A is a diagram showing an example of operations and display changes.
Figure 26B:
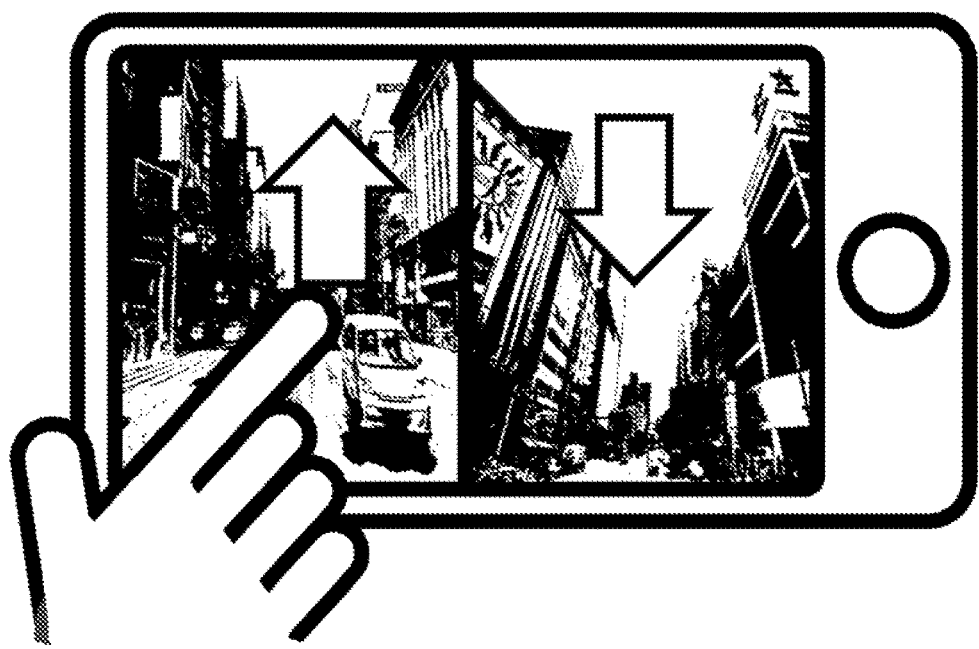
FIG. 26B is a diagram showing an example of operations and display changes.

FIG. 26A and FIG. 26B also show the case where the screen is equally divided into the two columns (the right and left viewing areas) in landscape orientation and the association display direction of moving in the right viewing area is set to the direction opposite to the direction of moving in the left viewing area. In this case, when an upward sliding operation is performed in the left viewing area as shown in FIG. 26A, an image in the left viewing area moves in an upward direction while an image in the right viewing area moves in a downward direction as shown in FIG. 26B.

Figure 27A:
FIG. 27A is a diagram showing an example of operations and display changes.
Figure 27B:
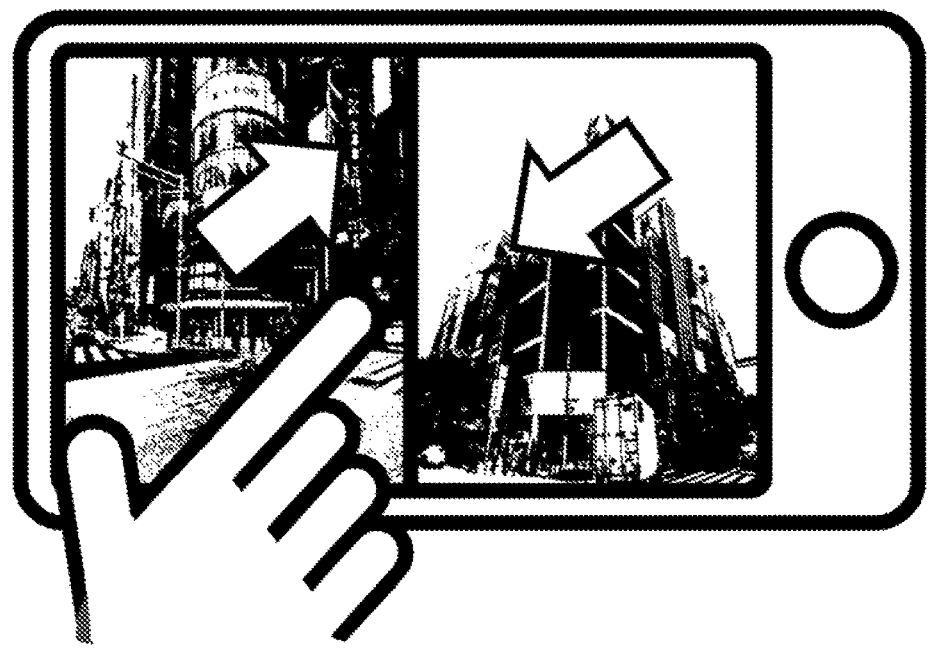
FIG. 27B is a diagram showing an example of operations and display changes.

FIG. 27A and FIG. 27B also show the case where the screen is equally divided into the two columns (the right and left viewing areas) in landscape orientation and the association display direction of moving in the right viewing area is set to the direction opposite to the direction of moving in the left viewing area. In this case, when a sliding operation in a right upward diagonal direction is performed in the left viewing area as shown in FIG. 27A, an image in the left viewing area moves in the right upward diagonal direction while an image in the right viewing area moves in a left downward diagonal direction as shown in FIG. 27B.

Figure 28A:
FIG. 28A is a diagram showing an example of operations and display changes.
Figure 28B:
FIG. 28B is a diagram showing an example of operations and display changes.

FIG. 28A and FIG. 28B show the case where the screen is equally divided into the two rows (the upper and lower viewing areas) in portrait orientation and the association display direction of moving in the upper viewing area is set to the direction opposite to the direction of moving in the lower viewing area. In this case, when a sliding operation in a right upward diagonal direction is performed in a range from the lower viewing area to the upper viewing area as shown in FIG. 28A, an image in the lower viewing area moves in the right upward diagonal direction while an image in the upper viewing area moves in a left downward diagonal direction as shown in FIG. 28B.

Figure 29A:
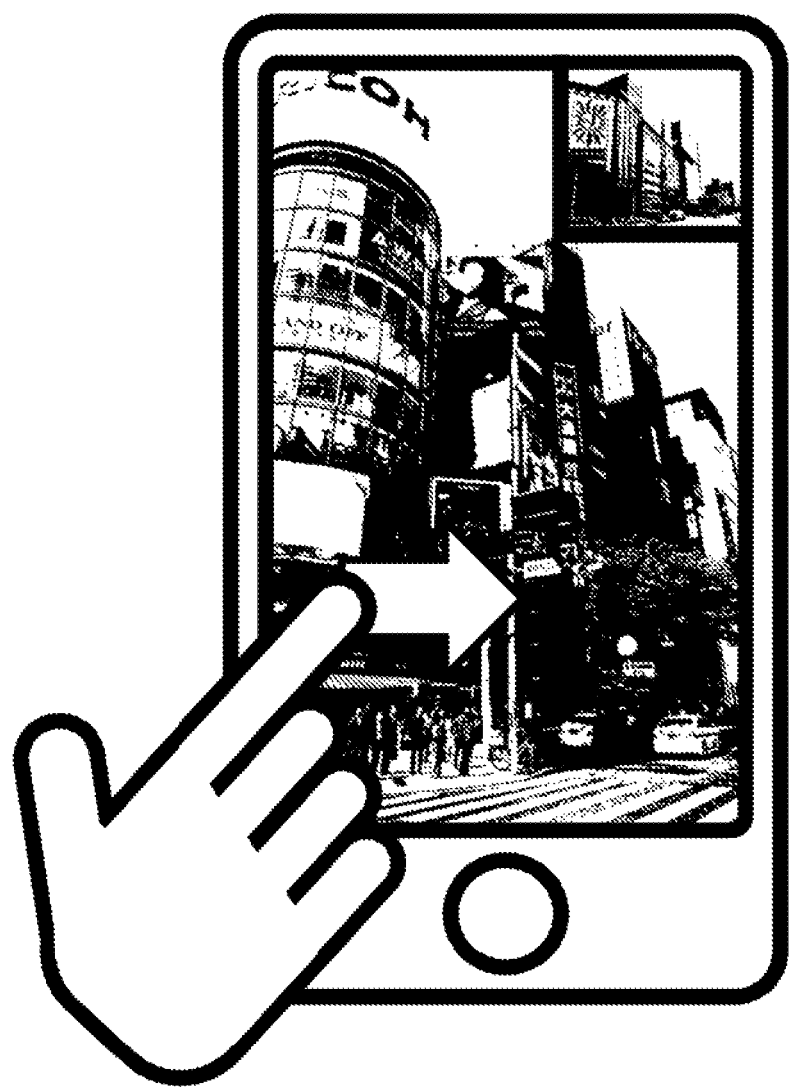
FIG. 29A is a diagram showing an example of operations and display changes.
Figure 29B:
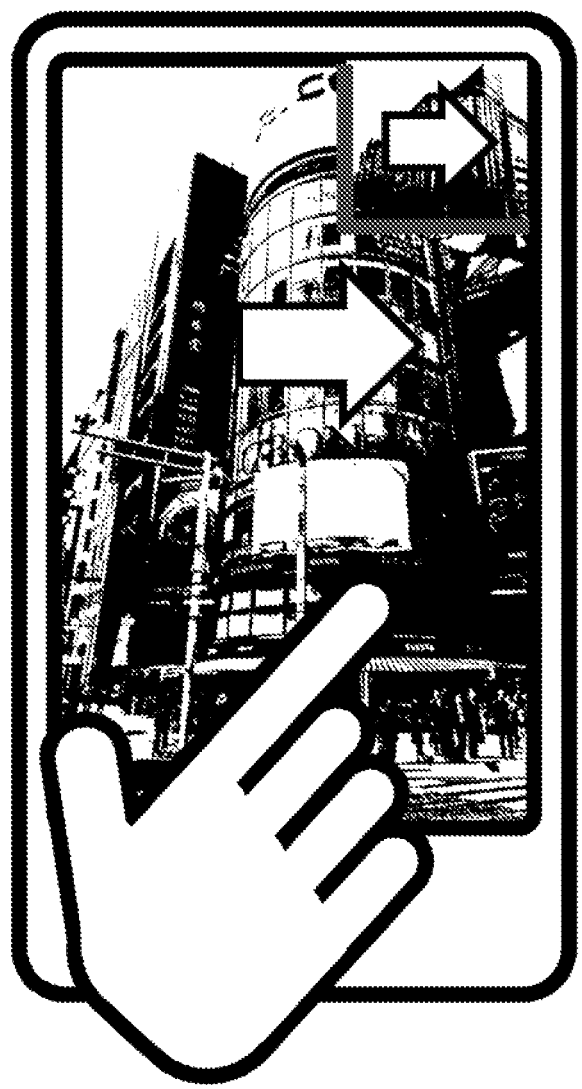
FIG. 29B is a diagram showing an example of operations and display changes.

FIG. 29A and FIG. 29B show a case where the screen is divided into two areas (a small viewing area at an upper right corner portion of the screen and a large viewing area spreading over the whole screen) in portrait orientation and the association display direction of moving in the small viewing area is set to the direction which is the same as the direction of moving in the large viewing area. In this case, when a rightward sliding operation is performed in the large viewing area as shown in FIG. 29A, an image in the large viewing area moves in a right direction and an image in the small viewing area moves in the right direction as shown in FIG. 29B.

Figure 30A:
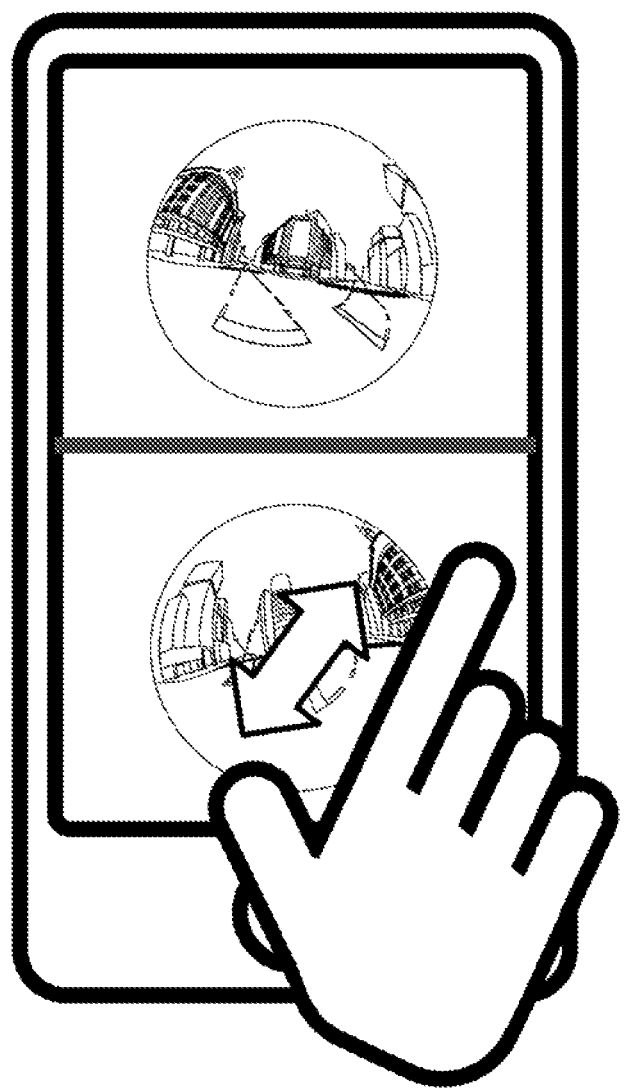
FIG. 30A is a diagram showing an example of operations and display changes.
Figure 30B:
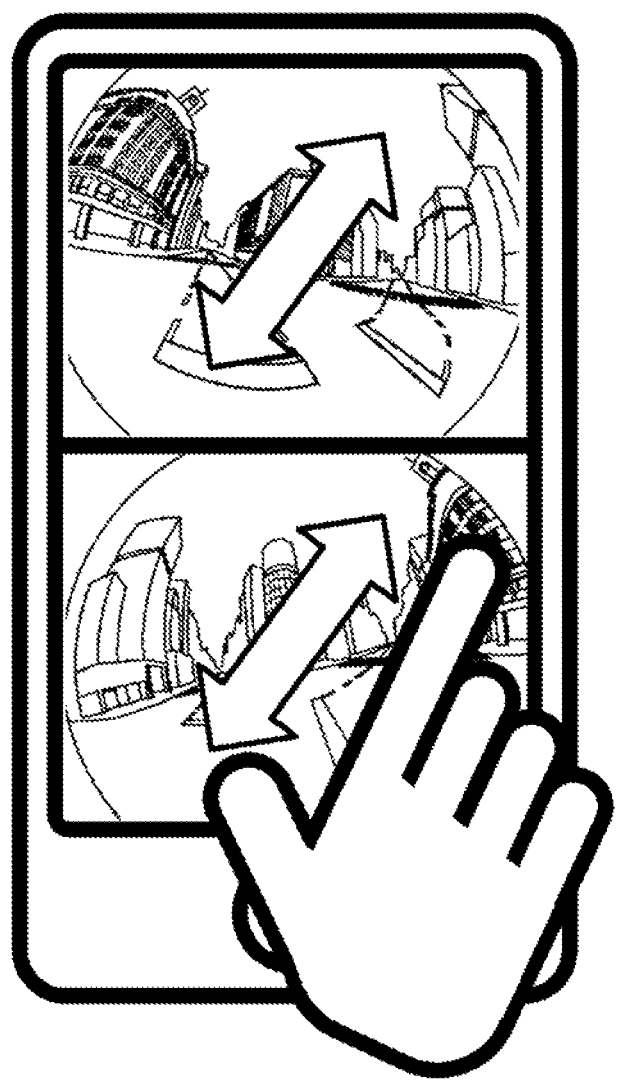
FIG. 30B is a diagram showing an example of operations and display changes.

FIG. 30A and FIG. 30B show a case where the screen is equally divided into the two rows (the upper and lower viewing areas) in portrait orientation and the association display direction of resizing in the upper viewing area is set to the direction which is the same as the direction of resizing in the lower viewing area. In this case, when a pinch-out operation is performed in the lower viewing area as shown in FIG. 30A, an image in the lower viewing area is expanded and an image in the upper viewing area is also expanded as shown in FIG. 30B.

Figure 31A:
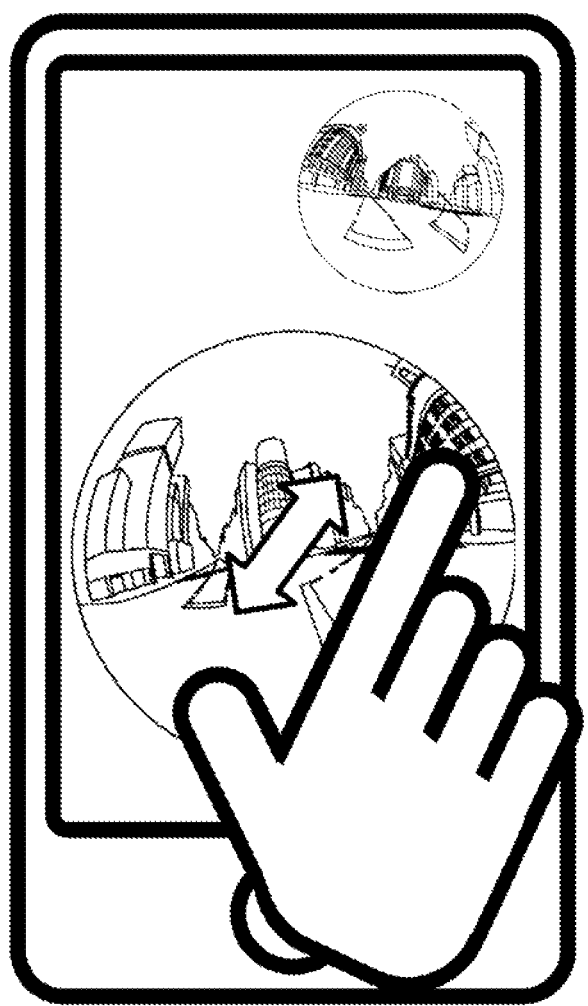
FIG. 31A is a diagram showing an example of operations and display changes.
Figure 31B:
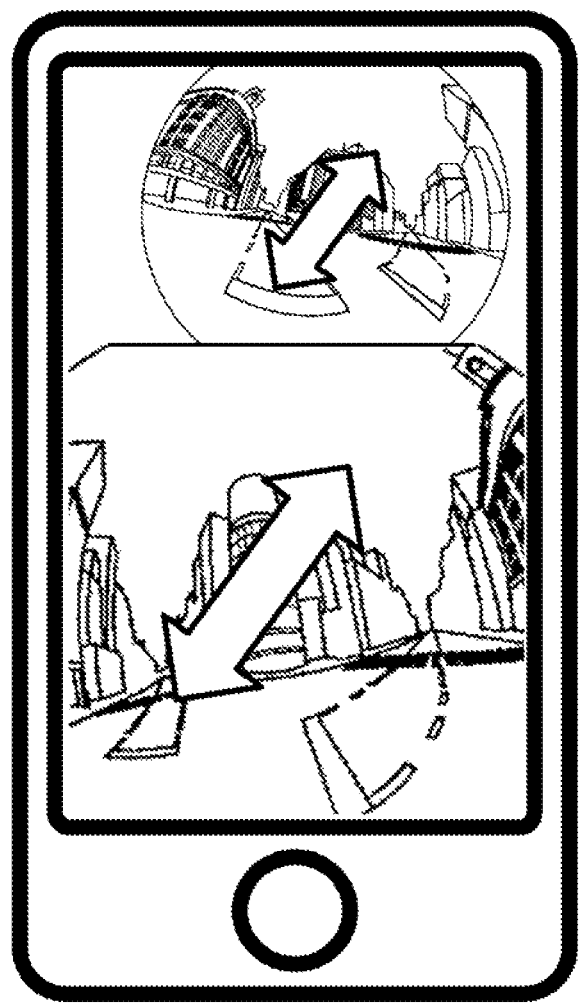
FIG. 31B is a diagram showing an example of operations and display changes.

FIG. 31A and FIG. 31B show a case where the screen is divided into the two areas (the small and large viewing areas) in portrait orientation and the association display direction of resizing in the upper viewing area is set to the direction which is the same as the direction of resizing in the lower viewing area. In this case, when a pinch-out operation is performed in the lower viewing area as shown in FIG. 31A, an image in the lower viewing area is expanded and an image in the upper viewing area is also expanded as shown in FIG. 31B.

As described in the foregoing, the image display system according to the invention is capable of providing a user interface which enables flexible operations to be performed when displaying an image in a plurality of viewing areas.

The image display system according to the invention is not limited to the above-described embodiments, and variations and modifications may be made without departing from the scope of the present invention.

The image acquisition unit 21 in the foregoing embodiment is an example of "image acquisition unit." The area setting unit 222 in the foregoing embodiment is an example of "area setting unit." The image assignment unit 223 in the foregoing embodiment is an example of "image assignment unit." The operation determination unit 224 in the foregoing embodiment is an example of "operation determination unit." The image operation unit 225 in the foregoing embodiment is an example of "display control unit." The area control unit 22 in the foregoing embodiment is an example of "displaying unit." The area control unit 22 in the foregoing embodiment is an example of "image portion changing unit."

What is claimed is:

1. An image display system comprising one or more hardware processors configured to:
   acquire an image;
   set a plurality of viewing areas to which the image is to be assigned according to a direction of the image;
   assign the image to each of the plurality of viewing areas;
   receive an operation in a first viewing area among the plurality of viewing areas each having the image assigned thereto; and
   change, based on the operation, the image displayed in the first viewing area and the image displayed in a second viewing area other than the first viewing area among the plurality of viewing areas,
   wherein, when the operation covers the first and second viewing areas, the one or more hardware processors are configured to determine that an operation with respect to an earlier touched area of the first and second viewing areas is performed continuously.

2. The image display system according to claim 1, wherein the one or more hardware processors are configured to set an association display direction between the plurality of viewing areas and the one or more hardware processors are configured to change the image in the second viewing area based on the association display direction in response to a change of the image in the first viewing area.

3. The image display system according to claim 2, wherein the association display direction includes an association display direction of moving the image and an association display direction of resizing the image, and the association display direction includes a same direction and an opposite direction.

4. The image display system according to claim 2, wherein the one or more hardware processors are configured to determine an amount of change based on a ratio of a typical length of the first viewing area and a typical length of the second viewing area.

5. The image display system according to claim 1, wherein the operation for changing the image is a swipe operation, a pinch-out operation, or a pinch-in operation.

6. The image display system according to claim 5, wherein the change of the image by the swipe operation is movement of the image.

7. The image display system according to claim 5, wherein the change of the image by the pinch-out operation or the pinch-in operation is resizing of the image.

8. An image display method performed by an information processing apparatus, the method comprising:
   acquiring an image;
   setting a plurality of viewing areas to which the image is to be assigned according to a direction of the image;
   assigning the image to each of the plurality of viewing areas;
   receiving an operation in a first viewing area among the plurality of viewing areas each having the image assigned thereto;
   changing, based on the operation, the image displayed in the first viewing area and the image displayed in a second viewing area other than the first viewing area among the plurality of viewing areas; and
   determining, when the operation covers the first and second viewing areas, that an operation with respect to an earlier touched area of the first and second viewing areas is performed continuously.

9. The image display method according to claim 8, wherein the operation for changing the image is a swipe operation, a pinch-out operation, or a pinch-in operation.

10. The image display method according to claim 9, wherein the changing of the image by the swipe operation is movement of the image.

11. The image display method according to claim 9, wherein the changing of the image by the pinch-out operation or the pinch-in operation is resizing of the image.

12. The image display method according to claim 8, further comprising:
    setting an association display direction between the plurality of viewing areas and the one or more hardware processors are configured to change the image in the second viewing area based on the association display direction in response to a change of the image in the first viewing area.

13. The image display method according to claim 12, wherein the association display direction includes an association display direction of moving the image and an association display direction of resizing the image, and the association display direction includes a same direction and an opposite direction.

14. The image display method according to claim 12, further comprising:
    determining an amount of change based on a ratio of a typical length of the first viewing area and a typical length of the second viewing area.

15. A non-transitory recording medium storing a program that causes an image display system to execute a process, the process comprising:
    acquiring an image;
    setting a plurality of viewing areas to which the image is to be assigned according to a direction of the image;
    assigning the image to each of the plurality of viewing areas;

receiving an operation in a first viewing area among the plurality of viewing areas each having the image assigned thereto;

changing, based on the operation, the image displayed in the first viewing area and the image displayed in a second viewing area other than the first viewing area among the plurality of viewing areas; and determining, when the operation covers the first and second viewing areas, that an operation with respect to an earlier touched area of the first and second viewing areas is performed continuously.

16. The non-transitory recording medium according to claim 15, wherein the operation for changing the image is a swipe operation, a pinch-out operation, or a pinch-in operation.

17. The non-transitory recording medium according to claim 16, wherein the changing of the image by the swipe operation is movement of the image.

18. The non-transitory recording medium according to claim 16, wherein the changing of the image by the pinch-out operation or the pinch-in operation is resizing of the image.

* * * * *